(12) United States Patent
Ito et al.

(10) Patent No.: US 12,600,667 B2
(45) Date of Patent: Apr. 14, 2026

(54) GLASS SHEET FOR CHEMICAL STRENGTHENING, MANUFACTURING METHOD OF STRENGTHENED GLASS SHEET, AND GLASS SHEET

(71) Applicant: Nippon Electric Glass Co., Ltd., Shiga (JP)

(72) Inventors: Shigeyoshi Ito, Shiga (JP); Masashi Kosugi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 222 days.

(21) Appl. No.: 18/278,718

(22) PCT Filed: Mar. 8, 2022

(86) PCT No.: PCT/JP2022/010127
§ 371 (c)(1),
(2) Date: Aug. 24, 2023

(87) PCT Pub. No.: WO2022/202300
PCT Pub. Date: Sep. 29, 2022

(65) Prior Publication Data
US 2024/0132399 A1 Apr. 25, 2024
US 2024/0228371 A9 Jul. 11, 2024

(30) Foreign Application Priority Data

Mar. 23, 2021 (JP) ................................. 2021-048561

(51) Int. Cl.
C03C 21/00 (2006.01)
C03B 17/06 (2006.01)
C03C 3/091 (2006.01)
(52) U.S. Cl.
CPC ............ C03C 21/002 (2013.01); C03C 3/091 (2013.01); C03B 17/064 (2013.01)

(58) Field of Classification Search
CPC .................................................... C03C 21/002
See application file for complete search history.

(56) References Cited

U.S. PATENT DOCUMENTS

2015/0253914 A1 9/2015 Hamada et al.
2016/0115074 A1 4/2016 Yasuda et al.
(Continued)

FOREIGN PATENT DOCUMENTS

JP 2014-75061 4/2014
JP 2017-137237 8/2017
(Continued)

OTHER PUBLICATIONS

Extended European Search Report issued Jan. 8, 2025 in European Patent Application No. 22775092.4.
(Continued)

*Primary Examiner* — Liam J Heincer
(74) *Attorney, Agent, or Firm* — WENDEROTH, LIND & PONACK, L.L.P.

(57) ABSTRACT

In a glass sheet 12 for chemical strengthening having a thickness of 0.1 mm or less, the glass sheet 12 has a warped shape as a whole or includes a warped part in a portion thereof. When the glass sheet 12 is placed on a horizontal surface with one main surface 12a facing upward, a first peak position D1 is present in a part inside a peripheral edge portion 12e of the glass sheet 12, where the first peak position D1 is a position having the highest height from the horizontal surface in the glass sheet 12, and the peripheral edge portion 12e is a part having a width of 10 mm along a peripheral edge of the glass sheet 12.

15 Claims, 12 Drawing Sheets

(56) References Cited

U.S. PATENT DOCUMENTS

| | | | | |
|---|---|---|---|---|
| 2017/0029318 | A1* | 2/2017 | Kato | C03C 3/085 |
| 2017/0183259 | A1 | 6/2017 | Da et al. | |
| 2017/0225994 | A1 | 8/2017 | Buellesfeld et al. | |
| 2018/0072619 | A1* | 3/2018 | Kashima | C03C 21/002 |
| 2018/0101253 | A1* | 4/2018 | He | C03C 27/10 |
| 2018/0162767 | A1* | 6/2018 | Lambricht | C03C 3/087 |
| 2019/0062200 | A1* | 2/2019 | He | C03C 3/078 |
| 2020/0398530 | A1* | 12/2020 | Kuo | B32B 7/12 |
| 2021/0009462 | A1* | 1/2021 | Murayama | C03C 23/0075 |
| 2022/0194848 | A1* | 6/2022 | Park | C03C 21/002 |
| 2023/0168718 | A1* | 6/2023 | Lee | G06F 1/16 |
| | | | | 428/410 |
| 2023/0250013 | A1* | 8/2023 | Noda | C03C 3/083 |
| | | | | 65/31 |
| 2024/0360030 | A1* | 10/2024 | Gao | C03C 21/002 |
| 2024/0417320 | A1* | 12/2024 | Bellman | B32B 17/06 |
| 2025/0136501 | A1* | 5/2025 | Allan | B32B 9/005 |

FOREIGN PATENT DOCUMENTS

| | | | | |
|---|---|---|---|---|
| JP | | 2017-529304 | 10/2017 | |
| JP | | 2018-67709 | 4/2018 | |
| JP | | 2018-188360 | 11/2018 | |
| WO | WO-2016037343 A1 * | 3/2016 | | C03C 3/093 |
| WO | | 2016/163373 | 10/2016 | |
| WO | | 2022/196046 | 9/2022 | |
| WO | | 2023/097651 | 6/2023 | |

OTHER PUBLICATIONS

International Preliminary Report on Patentability and Written Opinion of the International Searching Authority issued on Sep. 12, 2023 in International (PCT) Patent Application No. PCT/JP2022/010127.

International Search Report (ISR) issued May 31, 2022 in International (PCT) Application No. PCT/JP2022/010127.

Office Action issued Jul. 28, 2025 in corresponding Chinese Patent Application No. 202280008857.0, with English translation.

* cited by examiner

GLASS SHEET FOR CHEMICAL STRENGTHENING, MANUFACTURING METHOD OF STRENGTHENED GLASS SHEET, AND GLASS SHEET

TECHNICAL FIELD

The present disclosure relates to a glass sheet for chemical strengthening (an ion-exchangeable glass sheet), a method for manufacturing a strengthened glass sheet from the glass sheet, and a glass sheet.

BACKGROUND ART

In recent years, screens of portable electronic devices, such as smartphones and tablet PCs, have been increasing in size. However, when the screen is increased in size, the device as a whole increases in size and portability deteriorates. Therefore, in order to achieve both a large screen and good portability, foldable devices that can be folded have been proposed.

The cover glass used in such foldable devices is required to have a sheet thickness that is thinner than ever to be bendable. For example, an ultra-thin strengthened glass sheet as disclosed in Patent Document 1 is employed. The strengthened glass sheet is manufactured from an ultra-thin glass sheet for chemical strengthening (for example, having a thickness of 0.1 mm or less), which serves as the base of the strengthened glass sheet.

CITATION LIST

Patent Literature

Patent Document 1: JP 2018-188360 A

SUMMARY OF INVENTION

Technical Problem

The above-described glass sheet for chemical strengthening undergoes various manufacturing steps, such as a cleaning step for cleaning a surface of the glass sheet and a cutting out step for cutting out the glass sheet into a product size, before the glass sheet is turned into the strengthened glass sheet. At this point, a deflection of the glass sheet increases due to the thinness of the sheet thickness. The deflection of the glass sheet is inversely proportional to the square of the sheet thickness. Thus, when the thickness is 0.1 mm or less or moreover 0.05 mm or less, or when the thickness is even 0.04 mm or less, the deflection becomes more prominent, and handling and conveyance of the glass sheet is likely to be difficult. Here, in a forming step of the glass sheet for chemical strengthening that serves as the base of the strengthened glass sheet, the thinner the thickness of the strengthened glass sheet to be manufactured, the greater the difference in sheet thickness between glass pool portions at widthwise end portions and an effective portion at a widthwise central portion (the part including a portion to be turned into a product later) present in a glass ribbon. Therefore, when an ultra-thin glass sheet having a uniform sheet thickness over the entire width of the effective portion is to be manufactured, wave-like discontinuous warpage is likely to occur at or near both ends in a width direction of the effective portion at the time of adjusting forming conditions such as temperature distribution, and it is difficult to manufacture a flat glass sheet having uniformly little warpage. In addition, there is a problem in that the glass sheet is easily broken in the manufacturing steps due to warpage present in the glass sheet during or after forming.

An example of a mode in which such an ultra-thin glass sheet for chemical strengthening is broken will be given. For example, a glass sheet for chemical strengthening to be used as a cover glass for a foldable device is preferably formed by an overflow down-draw method, for example. In this case, since the glass sheet is continuously formed, glass pool portions having a relatively large sheet thickness are present at both end portions in a width direction of the glass ribbon after the melting, forming, and annealing steps. Non-effective portions (parts to be discarded without being turned into a product) including these glass pool portions are then cut and removed by a cutting method, such as diamond scribing or laser scribing, while leaving the above-mentioned effective portion having a relatively uniform sheet thickness. However, if warpage were present at or near both ends in the width direction of the effective portion as described above, scribing would not be uniformly performed when the non-effective portions are cut and removed, and unintended breakage might be induced in the effective portion.

As another example of a mode in which an ultra-thin glass sheet for chemical strengthening is broken, when a glass sheet cut out from a glass ribbon is cut into a desired size while being sucked or with the glass sheet placed on a smooth plate such as a surface plate, breakage may occur starting from a location (lifted location) that is partially unsucked due to warpage. As still another example of a mode, when a glass sheet for chemical strengthening is cleaned while being conveyed, the glass sheet may be caught by a cleaning brush or conveyance rollers due to warpage added in synergy with the deflection of the glass sheet, or an end surface of the glass sheet may sag into a gap located between adjacent conveyance rollers and be broken.

In view of the above-described circumstances, a technical problem to be solved is to avoid, as much as possible, breakage during manufacturing steps due to warpage in a glass sheet including an ultra-thin glass sheet for chemical strengthening.

Solution to Problem

As a result of intensive studies, the inventors have obtained the following findings (A) and (B).

(A) It is extremely difficult to prevent the occurrence of warpage itself in an ultra-thin glass sheet for chemical strengthening having a thickness of 0.1 mm or less.

(B) The occurrence of warpage itself cannot be prevented. However, of the warpages included in the glass sheet when the glass sheet is placed on a horizontal surface, if the position at which a warpage having the highest height from the horizontal surface (the warpage protruding upward the most) is present is a position inwardly away from a peripheral edge of the glass sheet, breakage of the glass sheet during manufacturing steps can be avoided as much as possible.

Based on the above-mentioned findings, a glass sheet for solving the above-mentioned problems is a glass sheet for chemical strengthening having a thickness of 0.1 mm or less and including warpage, in which a first peak position is present in a part inside a peripheral edge portion of the glass sheet under the following definitions (1) to (8).

(1) The thickness of the glass sheet is defined as t [mm].

(2) When a first placement form is adopted in which the glass sheet is placed on a horizontal surface with one main surface facing upward, a position having a highest height from the horizontal surface in the glass sheet is defined as a first peak position.

(3) A height of the glass sheet from the horizontal surface at the first peak position is defined as $W_{1MAX}$ [mm].

(4) When a second placement form is adopted in which the glass sheet is placed on the horizontal surface with another main surface on a back side of the one main surface facing upward, a position having a highest height from the horizontal surface in the glass sheet is defined as a second peak position.

(5) A height of the glass sheet from the horizontal surface at the second peak position is defined as $W_{2MAX}$ [mm].

(6) A part having a width of 10 mm along a peripheral edge of the glass sheet is defined as a peripheral edge portion.

(7) When the first placement form is adopted, a height at a position having a highest height from the horizontal surface in the peripheral edge portion is defined as $W_{1OUT}$ [mm].

(8) When the second placement form is adopted, a height at a position having a highest height from the horizontal surface in the peripheral edge portion is defined as $W_{2OUT}$ [mm].

In the present glass sheet, the first peak position is present in a part inside the peripheral edge portion of the glass sheet. The first peak position is a position corresponding to a top portion of a warpage having the highest height from the horizontal surface (the warpage protruding upward the most) of the warpages included in the glass sheet under the first placement form. Therefore, when the first peak position is present in a part inside the peripheral edge portion, the position at which the warpage having the highest height from the horizontal surface is present is a position inwardly away from the peripheral edge of the glass sheet. Accordingly, with the present glass sheet, breakage of the glass sheet during manufacturing steps can be avoided as much as possible. Note that as another aspect of the present invention, for example, a part having a width of 20 mm along the peripheral edge of the glass sheet may be set as the peripheral edge portion, or a part having a width of 30 mm may be set as the peripheral edge portion. When the width of the peripheral edge portion is changed in this way, the width of the peripheral edge portion of the glass sheet is preferably within a range from 10 mm to 50 mm, for example.

In the above-mentioned glass sheet, a relationship of $t^2/W_{1OUT}>0.005$ is preferably satisfied. In addition, a relationship of $W_{1OUT}\leq 0.20$ mm is preferably satisfied. Furthermore, a relationship of $W_{1OUT}/t<5$ is preferably satisfied.

As a result of intensive studies, the inventors have obtained the following finding (C).

(C) With respect to warpage present in the peripheral edge portion under the first placement form, the higher the height from the horizontal surface (the dimension of upward protrusion), the more likely that the glass sheet is broken during the manufacturing steps. That is, the greater the value of $W_{1OUT}$, the more likely that the glass sheet is broken.

In addition, the thinner the thickness of the glass sheet, the more likely that deflection increases at the peripheral edge portion of the glass sheet during the manufacturing steps, and thus the more likely that the glass sheet is broken. Note that the magnitude of deflection is inversely proportional to the square of the thickness of the glass sheet. Based on the above, the smaller the value of $W_{1OUT}$, or the smaller the value of $W_{1OUT}$ or the value of t or the value of $t^2$, the more advantageous it is in avoiding breakage of the glass sheet.

When the above-described relationships are satisfied, breakage of the glass sheet can be more suitably avoided.

In the above-mentioned glass sheet, a relationship of $W_{1MAX}/t<15$ is preferably satisfied.

In order to avoid breakage, it is advantageous that the thinner the thickness of the glass sheet, the smaller the value of $W_{1MAX}$ (which corresponds to the height of the top portion of the warpage having the highest height from the horizontal surface under the first placement form). When the above-described relationships are satisfied, breakage of the glass sheet can be further suitably avoided. In addition, it is also preferable that the above-described relationships are satisfied when, in a subsequent step of manufacturing a strengthened glass sheet from the glass sheet, the glass sheet is subjected to various steps, such as cutting into small pieces with the glass sheets being layered or the glass sheet being a single body, or post-treatment steps, such as polishing or chemical treatment of an end surface of the peripheral edge portion. Reducing the warpage in the entire glass sheet for chemical strengthening is also advantageous in preventing deformation, such as warpage or unevenness beyond an allowable range, from occurring in the strengthened glass sheet manufactured from the glass sheet.

In the above-mentioned glass sheet, the one main surface and the another main surface may be fire-polished surfaces. That is, the glass sheet may be one whose front and back surfaces are not subjected to a polishing treatment (for example, a chemical polishing treatment, such as a slimming treatment for reducing the thickness) after forming. Note that there is also a method of obtaining an ultra-thin glass sheet for chemical strengthening by slimming (reducing the sheet thickness of) a relatively thick (for example, from more than 0.1 mm to 0.4 mm) glass sheet by a chemical method using a glass-corrosive chemical, such as hydrofluoric acid. In this case, it is difficult to uniformly reduce the sheet thickness in the slimming step, and it is difficult to achieve uniformity in the sheet thickness of the obtained glass sheet. Therefore, a variation in the sheet thickness of the obtained glass sheet may increase, or warpage may be induced. Such variation in the sheet thickness or occurrence of warpage further expand the warpage in the subsequent strengthening step, thereby inducing surface unevenness. Therefore, directly forming an ultra-thin glass sheet for chemical strengthening is very suitable for obtaining a flatter glass sheet.

In the above-mentioned glass sheet, the thickness of the glass sheet may be 0.05 mm or less. Also, the glass sheet as a whole may have a substantially uniform thickness. Even in the case of such a glass sheet having an extremely thin thickness, breakage of the glass sheet during the manufacturing steps can be avoided as much as possible.

In the above-mentioned glass sheet, the second peak position is preferably present in a part inside the peripheral edge portion of the glass sheet.

As described above, when not only the first peak position is present in a part inside the peripheral edge portion of the glass sheet but also the second peak position is present in a part inside the peripheral edge portion of the glass sheet, it is further advantageous in avoiding breakage of the glass sheet during the manufacturing steps. This is further advantageous in preventing occurrence of a situation in which the peripheral edge portion sagging between adjacent conveyance rollers is caught by the conveyance rollers, for example, when the glass sheet is conveyed by conveyance rollers.

In the above-mentioned glass sheet, a relationship of $t^2/W_{2OUT}>0.005$ is preferably satisfied. Moreover, a relationship of $W_{2OUT} \leq 0.20$ mm is preferably satisfied. Furthermore, a relationship of $W_{2OUT}/t<5$ is preferably satisfied. In addition, a relationship of $W_{2MAX}/t<15$ is preferably satisfied.

By satisfying these relationships, as described above, it is possible to more suitably avoid breakage of the glass sheet for reasons similar to those given in the description that the respective relationships of $t^2/W_{1OUT}>0.005$, $W_{1OUT} \leq 0.20$ mm, $W_{1OUT}/t<5$, and $W_{1MAX}/t<15$ are preferably satisfied.

In the above-mentioned glass sheet, the glass sheet may be aluminosilicate glass, and may contain as a glass composition, in mass %, from 50% to 80% of $SiO_2$, from 5% to 25% of $Al_2O_3$, from 0% to 15% of $B_2O_3$, from 1% to 20% of $Na_2O$ and from 0% to 10% of $K_2O$.

In the above-mentioned glass sheet, the glass sheet may be aluminosilicate glass, and may contain as the glass composition, in mass %, from 60% to 80% of $SiO_2$, from 8% to 20% of $Al_2O_3$, from 0% to 5% of $B_2O_3$, from 4% to 16% of $Na_2O$, and from 0.01% to 10% of $K_2O$.

In the above-mentioned glass sheet, the glass sheet may have a rectangular shape, and the size of the glass sheet may be from 150 mm×150 mm to 1100 mm×1300 mm.

The effect of the above-described glass sheet (the effect of avoiding breakage as much as possible) is an effect that can be obtained not only in the cutting step or the cleaning step after forming, or when the glass sheet is conveyed during these steps, but also in a step of cutting out the glass sheet into a desired size before chemical strengthening to obtain a cover glass for a foldable device, a step of forming a film, or the post-treatment step of polishing or performing a chemical treatment on the end surface of the peripheral edge portion of the glass sheet with the glass sheets being layered or the glass sheet being a single body.

The glass sheet for chemical strengthening of the present invention may include a mode in which a peak of warpage is not included in the peripheral edge portion, especially at or near corner portions. Specifically, the glass sheet for chemical strengthening according to another aspect of the present invention is preferably a glass sheet for chemical strengthening having a thickness of 0.1 mm or less, in which the glass sheet has a warped shape as a whole or includes a warped part in a portion thereof, and when a first placement form is adopted in which the glass sheet is placed on a horizontal surface with one main surface facing upward, a first peak position is present in a part outside a region having a radius of 10 mm from corner portions of the glass sheet, where the first peak position is a position having a highest height from the horizontal surface in the glass sheet.

In this configuration, when a second placement form is adopted in which the glass sheet is placed on the horizontal surface with another main surface on a back side of the one main surface facing upward, a second peak position is preferably present in a part outside a region having a radius of 10 mm from corner portions of the glass sheet, where the second peak position is a position having a highest height from the horizontal surface in the glass sheet.

A manufacturing method of a strengthened glass sheet of the present invention includes preparing the above-mentioned glass sheet for chemical strengthening, cutting out a product-sized glass sheet from the glass sheet, and chemically strengthening the product-sized glass sheet to obtain a strengthened glass sheet. With such a manufacturing method of a strengthened glass sheet, it is easy to prevent the occurrence of warpage beyond an allowable range in the manufactured strengthened glass sheet.

Furthermore, the present invention is also applicable to glass sheets other than those used for chemical strengthening described above. That is, the glass sheet other than the glass sheet for chemical strengthening has a thickness of 0.1 mm or less, has a warped shape as a whole or includes a warped part in a portion thereof, and when a first placement form is adopted in which the glass sheet is placed on a horizontal surface with one main surface facing upward, a first peak position is present in a part inside a peripheral edge portion of the glass sheet, where the first peak position is a position having a highest height from the horizontal surface in the glass sheet, and the peripheral edge portion is a part having a width of 10 mm along a peripheral edge of the glass sheet.

In this glass sheet as well, when a second placement form is adopted in which the glass sheet is placed on the horizontal surface with another main surface on a back side of the one main surface facing upward, a second peak position may be present in a part inside the peripheral edge portion of the glass sheet, where the second peak position is a position having a highest height from the horizontal surface in the glass sheet.

Note that other configurations and characteristics of these glass sheets other than the glass sheet for chemical strengthening are the same as the configurations and characteristics of the glass sheet for chemical strengthening described above. Therefore, the glass sheet herein may be used as the glass sheet for chemical strengthening.

Advantageous Effects of Invention

According to the glass sheet including a glass sheet for chemical strengthening according to the present disclosure, it is possible to avoid breakage during the manufacturing steps due to warpage as much as possible.

DESCRIPTION OF EMBODIMENTS

Hereafter, a glass sheet for chemical strengthening and a manufacturing method of a strengthened glass sheet according to an embodiment will be described with reference to the accompanying drawings.

The manufacturing method of a strengthened glass sheet includes a preparation step of preparing a glass sheet for chemical strengthening, a cutting out step of cutting out a product-sized glass sheet from the prepared glass sheet, and a strengthening step of chemically strengthening the cut-out product-sized glass sheet to obtain a strengthened glass sheet.

Preparation Step

The glass sheet for chemical strengthening according to the present embodiment is manufactured by, for example, a known forming method involving sheet drawing, such as a down-draw method including an overflow down-draw method, a slot down-draw method, and a redraw method, or a float method. According to the overflow down-draw method, since both the front and back surfaces of a formed glass ribbon are formed without coming into contact with any part of a forming body in a forming process, there is an advantage that a fire-polished surface having a very smooth and very flat surface property is obtained, the very flat surface property being due to appropriate temperature control. In particular, in the case of an ultra-thin strengthened glass sheet, a scratch present on a glass surface at the time of bending serves as a starting point of breakage. Therefore, the overflow down-draw method is most suitable as a non-contact forming method that is unlikely to cause a scratch. In the present embodiment, a glass ribbon is formed by the overflow down-draw method, and a rectangular glass sheet having a predetermined size is obtained by cutting out the glass ribbon. The preparation step includes a forming step P1, an annealing step P2, and a cooling step P3 illustrated in FIGS. 1 and 2, as well as a cutting step (not illustrated).

Figure 1:
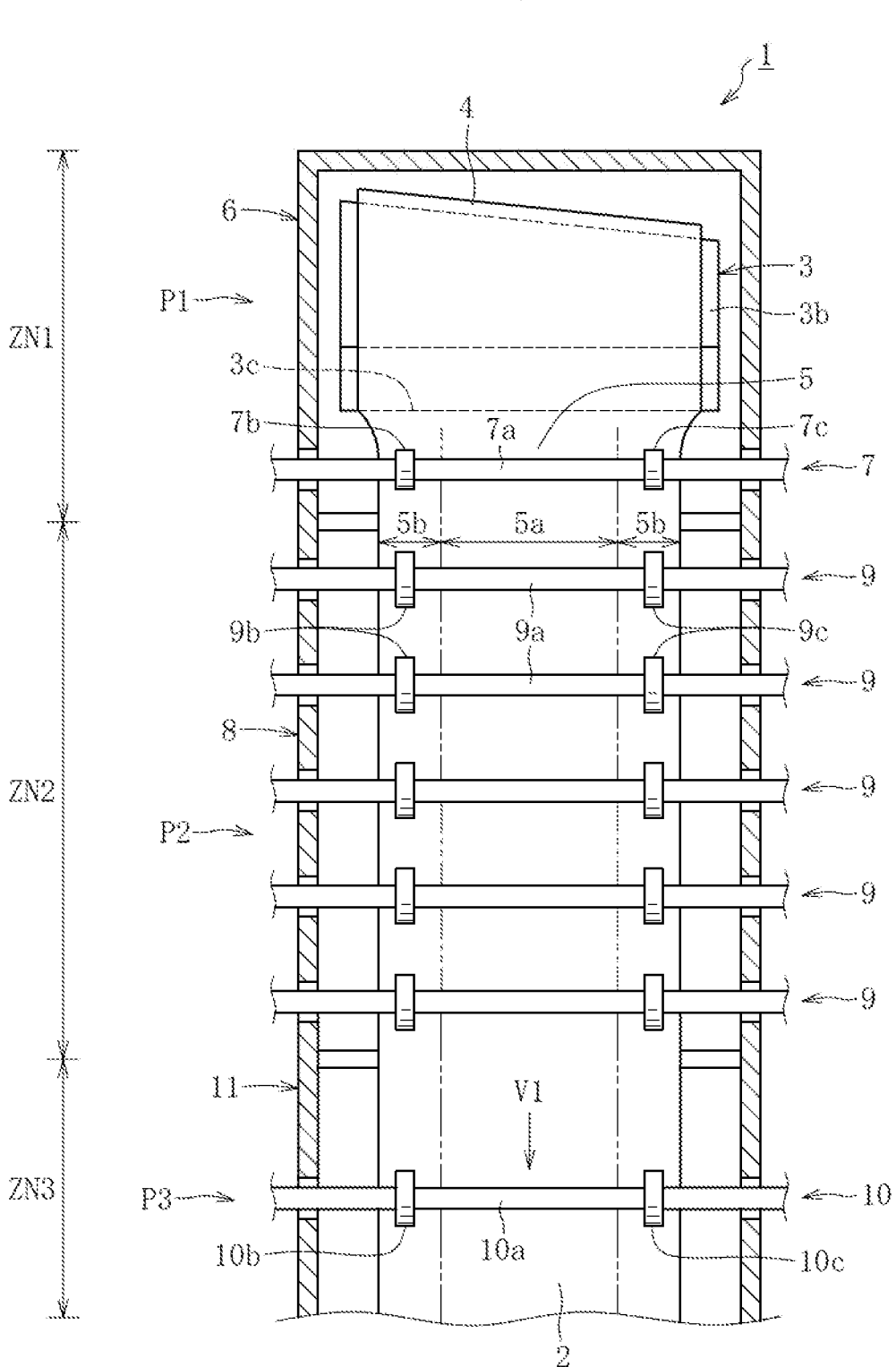
FIG. 1 is a cross-sectional view illustrating a preparation step in a manufacturing method of a strengthened glass sheet.
Figure 2:
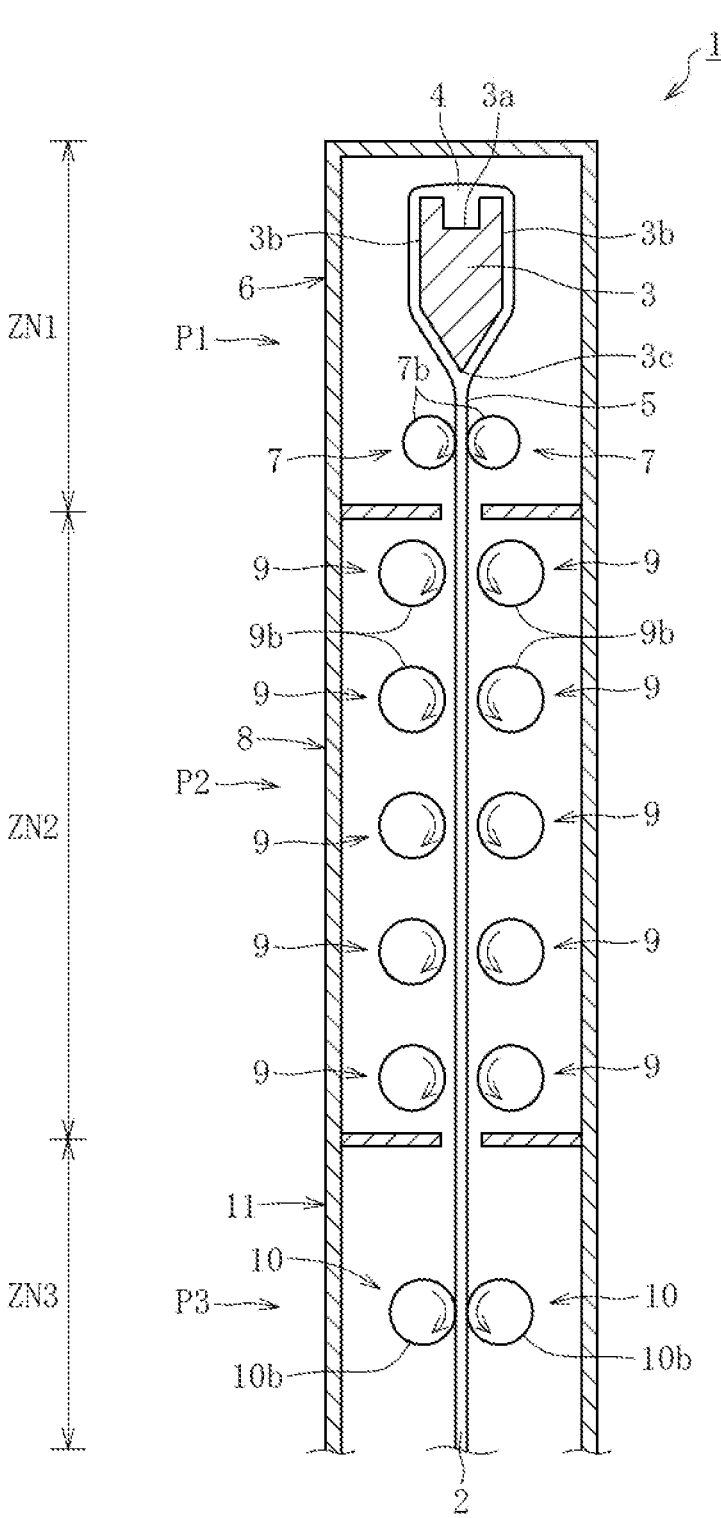
FIG. 2 is a cross-sectional view illustrating the preparation step in the manufacturing method of the strengthened glass sheet.

In the preparation step, first, the forming step P1 to the cooling step P3 are performed by using a manufacturing apparatus 1 illustrated in FIGS. 1 and 2 to obtain a band-shaped glass film 2 that serves as the base of the glass sheet for chemical strengthening.

The forming step P1 is performed in a forming zone ZN1. In the forming step P1, a glass ribbon 5 is continuously formed from a molten glass 4 by a forming body 3 for the overflow down-draw method. The forming body 3 is accommodated in a forming furnace 6. A heating device (for example, a panel heater) or the like (not illustrated) that heats the forming body 3 is installed at the forming furnace 6.

The forming body 3 includes a groove 3a that causes the molten glass 4 to flow in, a pair of side surfaces 3b, 3b that cause the molten glass 4 overflowing from both sides of the groove 3a to flow downward, and a lower end portion 3c that causes the molten glass 4 flowing downward along the respective side surfaces 3b to be fused (to converge). The molten glass 4 fused at the lower end portion 3c is formed into the glass ribbon 5 by the forming body 3.

The glass ribbon 5 includes an effective portion 5a located at the center in a width direction (left-right direction in FIG. 1, and a direction perpendicular to the paper surface in FIG. 2) of the glass ribbon 5, and non-effective portions 5b each located at a respective one of both ends in the width direction, with the effective portion 5a interposed therebetween. The effective portion 5a is a part including a portion that is later turned into a product. The non-effective portions 5b are parts that are not turned into a product and are later discarded. Glass pool portions (also referred to as selvage portions) that are thicker than other parts are formed in parts corresponding to widthwise end edges (edges) of the glass ribbon 5 of the non-effective portions 5b forming the widthwise end portions of the glass ribbon 5.

For the glass ribbon 5 immediately after being formed, shrinkage in the width direction is suppressed by using an edge roller 7 (a cooling roller) disposed immediately below the forming body 3.

A pair of the edge rollers 7 are disposed sandwiching the glass ribbon 5 in a thickness direction. Each of the pair of edge rollers 7, 7 includes a shaft 7a extending in the width direction of the glass ribbon 5, and a first roll 7b and a second roll 7c coupled to each other via the shaft 7a. Both of the rolls 7b, 7c are made of a heat-resistant material (such as platinum or a platinum alloy), and are each brought into contact with a respective one of the non-effective portions 5b of the glass ribbon 5. The glass ribbon 5 is fed downward while being sandwiched in the thickness direction between the first rolls 7b, 7b of the pair of edge rollers 7, 7 and between the second rolls 7c, 7c of the pair of edge rollers 7, 7 to suppress shrinkage in the width direction of the glass ribbon 5.

The annealing step P2 is performed in an annealing zone ZN2. In the annealing step P2, the glass ribbon 5 descending from the forming zone ZN1 is annealed to a temperature of a strain point or below while being guided downward. To perform the annealing step P2, an annealing furnace 8, and annealer rollers 9 disposed in a plurality of vertical stages (vertical five stages in the illustrated example) are used.

The annealing furnace 8 is disposed below the forming furnace 6. In the annealing furnace 8, a heating device (for example, a panel heater) or the like (not illustrated) that adjusts the atmosphere temperature in the annealing furnace 8 is installed. For example, in the case of a material of a glass sheet for chemical strengthening, a heating device, a heat insulating member, or the like is preferably provided that can adjust the temperature in a region from a temperature lower than a softening point (for example, 860° C.) to the strain point (for example, 560° C.), with a temperature gradient formed in a width direction of the glass sheet in the temperature range. In the annealing step P2, in particular in the initial stage of the annealing step P2 where the temperature of the glass ribbon 5 is relatively high, the annealing rate is relatively increased toward the parts in the widthwise end portions (toward the glass pool portions), and the annealing rate is relatively decreased toward the part in the widthwise central portion. Specifically, the annealing step P2 is performed at a temperature decreasing rate of, for example, from 1° C. to 10° C./sec at the central portion and from 3°

C. to 20° C./sec at the end portions. Accordingly, in the glass sheet (see FIGS. 3 and 4) obtained by the cutting step performed later, warpage at the peripheral edge portion of the glass sheet can be suppressed.

In each stage of the plurality of vertical stages, a pair of the annealer rollers 9 are disposed sandwiching the glass ribbon 5 in the thickness direction. Each of the pair of annealer rollers 9, 9 includes a shaft 9a extending in the width direction of the glass ribbon 5, and a first roll 9b and a second roll 9c coupled to each other via the shaft 9a. Both of the rolls 9b, 9c are made of ceramic as an example, and can each come into contact with a respective one of the non-effective portions 5b of the glass ribbon 5. The glass ribbon 5 is guided downward between the first rolls 9b, 9b of the pair of annealer rollers 9, 9 and between the second rolls 9c, 9c of the pair of annealer rollers 9, 9.

Here, the first rolls 9b, 9b and the second rolls 9c, 9c only restrict the glass ribbon 5 from shaking along the thickness direction without sandwiching the glass ribbon 5 from the front and back surfaces thereof. In other words, gaps are formed between the first roll 9b and the glass ribbon 5 and between the second roll 9c and the glass ribbon 5.

Note that as another method for suppressing warpage at the peripheral edge portion of the glass sheet obtained by the cutting step, there is also a method in which the non-effective portions 5b of the glass ribbon 5 are sandwiched by the annealer rollers 9 from both the front and back sides thereof in the annealing furnace 8 to change a tensile force in the width direction acting on the glass ribbon 5. For example, increasing the tensile force in the width direction acting on the glass ribbon 5 can suppress the warpage in the glass ribbon 5, in particular at both ends in the width direction of the effective portion 5a. As a result, warpage at the peripheral edge portion of the glass sheet can be suppressed.

The cooling step P3 is performed in a cooling zone ZN3. In the cooling step P3, the glass ribbon 5 that passed through the annealing zone ZN2 is cooled while being pulled downward by a support roller 10. The support roller 10 is disposed in a cooling chamber 11 disposed below the annealing furnace 8.

A pair of the support rollers 10 are disposed sandwiching the glass ribbon 5 in the thickness direction. Each of the pair of support rollers 10, 10 includes a shaft 10a extending in the width direction of the glass ribbon 5, and a first roll 10b and a second roll 10c coupled to each other via the shaft 10a. Both of the rolls 10b, 10c are made of rubber as an example, and are each brought into contact with a respective one of the non-effective portions 5b of the glass ribbon 5. A conveyance speed V1 (sheet pulling speed) of the glass ribbon 5 is determined by pulling the glass ribbon 5 with the glass ribbon 5 sandwiched in the thickness direction between the first rolls 10b, 10b of the pair of support rollers 10, 10 and between the second rolls 10c, 10c of the pair of support rollers 10, 10. The glass ribbon 5 that passed through the cooling zone ZN3 along with the conveyance is obtained as the band-shaped glass film 2.

When the cooling step P3 is completed, the cutting step is performed next.

In the cutting step, a first cutting for cutting out a glass film original sheet from the band-shaped glass film 2, and a second cutting for cutting out a glass sheet for chemical strengthening from the glass film original sheet are performed.

In the first cutting, the band-shaped glass film 2 is repeatedly cut (cut in a width direction) by a predetermined length to continuously cut out the glass film original sheets from the band-shaped glass film 2. Note that each of the cut-out glass film original sheets includes the effective portion 5a, and the non-effective portions 5b each located at a respective one of both ends, with the effective portion 5a interposed therebetween. In the second cutting, the non-effective portions 5b are separated and removed from each of the glass film original sheets to cut out the effective portion 5a as a glass sheet for chemical strengthening. Since the first and second cuttings can be performed by a known method, a detailed description thereof will be omitted.

Note that in the present embodiment, the non-effective portions 5b of the band-shaped glass film 2 are separated and removed after cutting out of the glass film original sheet. However, the present invention is not limited thereto. As another method, the glass sheet for chemical strengthening may be continuously cut out from the band-shaped glass film 2 by first continuously separating and removing the non-effective portions 5b of the band-shaped glass film 2 and then repeatedly cutting (cutting in the width direction) the band-shaped glass film 2 from which the non-effective portions 5b have been removed by a predetermined length.

In addition, a method may be employed in which the non-effective portions of the band-shaped glass film 2 are continuously separated and removed, and then the band-shaped glass film 2 is continuously wound in a roll shape with a band-shaped cushion material (such as a band-shaped protective sheet made of resin) interposed. In this case, it is sufficient that the band-shaped glass film 2 is unwound from the roll by a length required in a later step, and the glass sheet for chemical strengthening is cut out from the unwound band-shaped glass film 2. Therefore, an effect of improving collection efficiency of the glass sheet for chemical strengthening, that is, a cost reduction effect is achieved. Note that when this method is employed, the treatment of an end surface, such as polishing, heat treatment, and etching, which will be described later, may be performed after the glass sheet for chemical strengthening is cut out from the band-shaped glass film 2.

When the first and second cuttings are performed, the cutting step is completed, whereby the preparation step is completed. Note that although the glass sheet for chemical strengthening is obtained by using the overflow down-draw method in the present embodiment, besides that, the glass sheet for chemical strengthening may be obtained by using the slot down-draw method, the float method, the redraw method, or the like.

Here, the end surface of the cut-out glass sheet for chemical strengthening is preferably chamfered or treated to improve strength by polishing, heat treatment, etching, or the like. On the other hand, the front and back surfaces of the glass sheet for chemical strengthening are not subjected to a polishing treatment or the like (for example, a chemical polishing treatment, such as a slimming treatment for reducing the thickness) after forming. Therefore, the front and back surfaces of the glass sheet for chemical strengthening are fire-polished surfaces.

Figure 3:
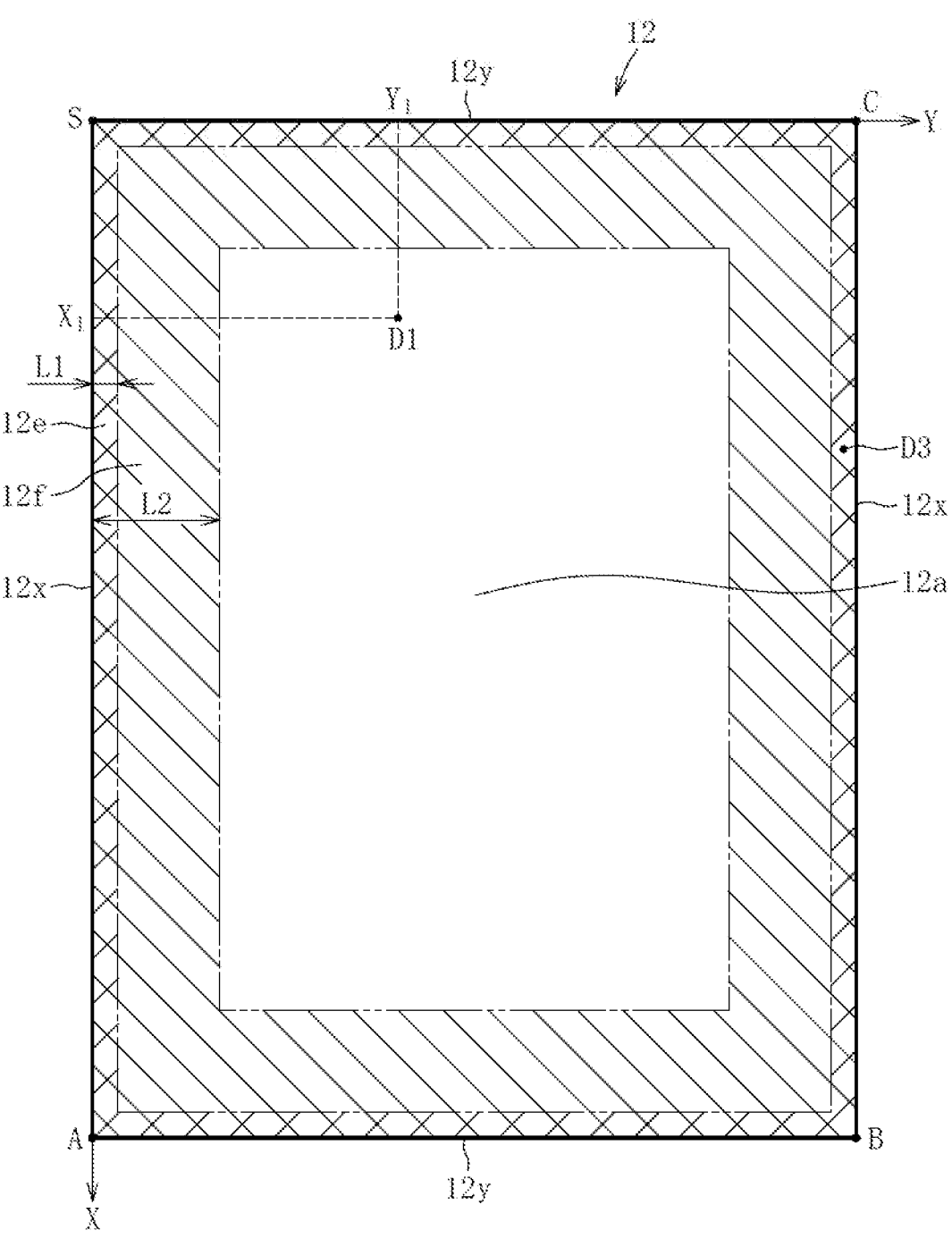
FIG. 3 is a plan view illustrating a glass sheet for chemical strengthening.
Figure 4:
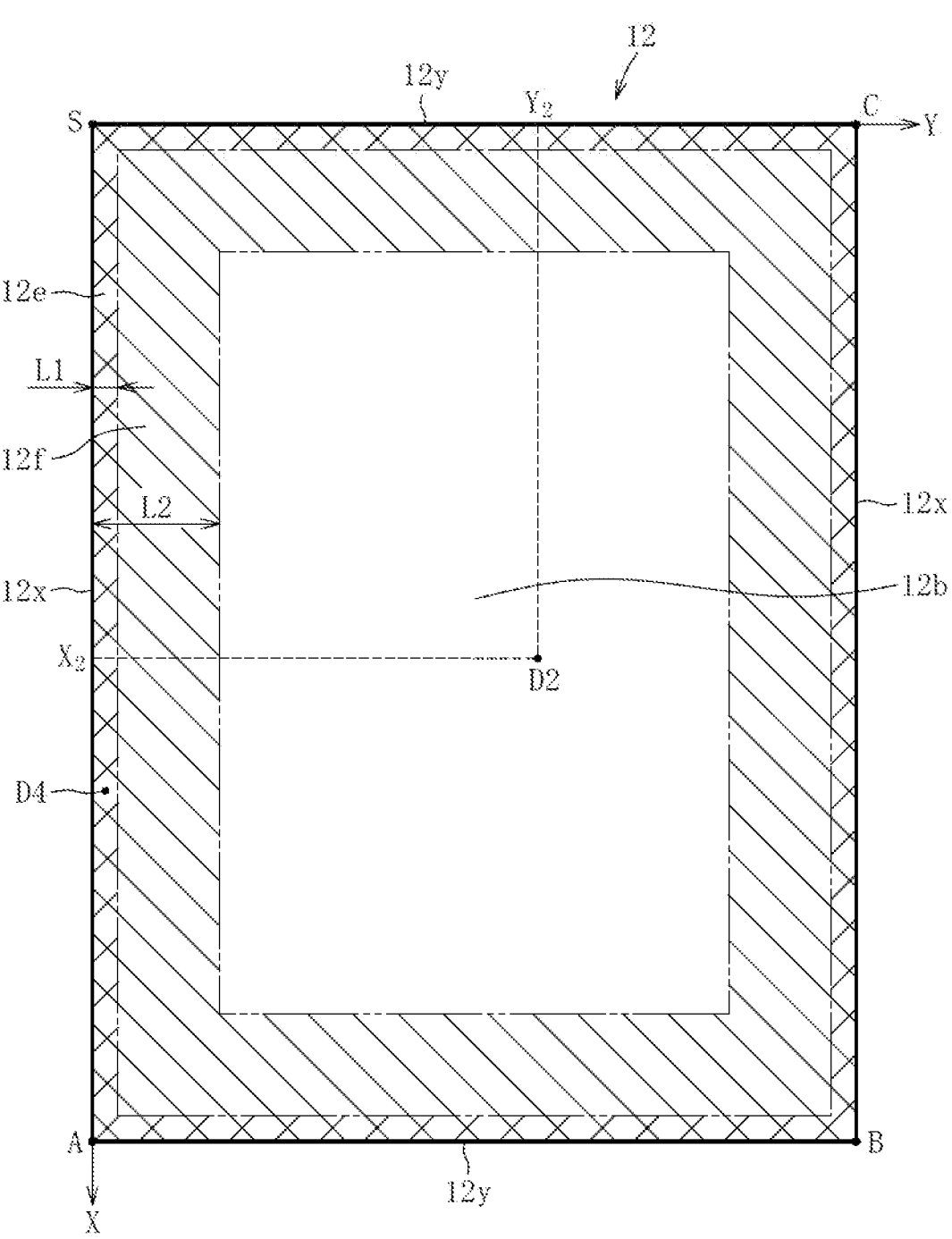
FIG. 4 is a plan view illustrating the glass sheet for chemical strengthening.

When the preparation step is completed as described above, a glass sheet for chemical strengthening 12 (hereinafter simply referred to as the glass sheet 12) as illustrated in FIGS. 3 and 4 is prepared. The glass sheet 12 illustrated in FIG. 3 and the glass sheet 12 illustrated in FIG. 4 are the same glass sheet. FIG. 3 illustrates a case where a first placement form is adopted in which the glass sheet 12 is placed on a horizontal surface with one main surface 12a of the front and back surfaces of the glass sheet 12 facing upward. On the other hand, FIG. 4 illustrates a case where a second placement form is adopted in which the glass sheet 12 is placed on the horizontal surface with another main surface 12b on the back side of the one main surface 12a facing upward. Note that the horizontal surface in the present embodiment is a horizontal support surface provided on a surface plate (not illustrated).

Note that the present embodiment illustrates as an example a case in which, of the front and back surfaces of the glass sheet 12, the one main surface 12a is a guaranteed surface, which is a surface suitable for being subjected to a film forming step or the like and whose surface property is to be guaranteed, and the another main surface 12b is a non-guaranteed surface, which is not required to have a surface property the same as or similar to that of the one main surface 12a. As a way of determining the guaranteed surface and the non-guaranteed surface, for example, of the front and back surfaces of the glass sheet 12, the one main surface 12a on the side on which the number of times of contact with conveyance rollers or the like until the point of time when the above-mentioned preparation step is completed is relatively small is used as the guaranteed surface, and the another main surface 12b on the side on which the number of times of contact is relatively large is used as the non-guaranteed surface. In this case, comparison between the one main surface 12a and the another main surface 12b reveals that defects, such as scratches and contamination, occur less on the one main surface 12a which is the guaranteed surface than on the another main surface 12b.

While there is no intention to limit the type of the glass sheet 12, the glass sheet 12 in the present embodiment is aluminosilicate glass. The glass sheet 12 contains, as one example of the glass composition, in mass %, from 50% to 80% of $SiO_2$, from 5% to 25% of $Al_2O_3$, from 0% to 15% of $B_2O_3$, from 1% to 20% of $Na_2O$, and from 0% to 10% of $K_2O$.

More preferably, the glass sheet 12 according to the present embodiment contains as the glass composition, in mass %, from 60% to 80% of $SiO_2$, from 8% to 18% of $Al_2O_3$, from 0% to 5% of $B_2O_3$, from 0.01% to 10% of $Li_2O$, from 4% to 16% of $Na_2O$, and from 0.01% to 10% of $K_2O$.

Note that increasing the content of $Al_2O_3$ greatly improves ion exchange performance of the glass for chemical strengthening, but with too high a content thereof, the devitrification deteriorates. That is, a liquidus temperature becomes too high or a liquidus viscosity becomes too low, making forming by the overflow down-draw method impossible.

$Na_2O$ is an ion-exchange component and has effects of lowering high-temperature viscosity of the glass to enhance meltability and formability, reducing incidence of cracks, and lowering the strain point. In addition, $Na_2O$ is also a component that improves devitrification. However, when the content of $Na_2O$ is increased, thermal expansion coefficient may become too high, decreasing thermal shock resistance of the glass or making it difficult to match the thermal expansion coefficient of peripheral materials. Also, with too large a content thereof, the devitrification tends to deteriorate instead.

$B_2O_3$ has the effect of lowering the liquidus temperature, high-temperature viscosity, and density of the glass. However, when the content of $B_2O_3$ is high, there is a possibility that burning occurs on a surface due to ion exchange. In addition, the strain point may be excessively lowered, causing stress relaxation to easily proceed during the ion exchange and a desired compressive stress may not be obtained.

The type of the glass sheet 12 in the present embodiment is not limited to the glass for chemical strengthening and the present invention may be applied to other ultra-thin glass sheets, such as low-alkali glass substrates. In an ultra-thin glass sheet, regardless of the material, the problem of occurrence of breakage due to warpage is similarly induced in handling steps, such as cutting, cleaning, packing, and chemical strengthening, and thus shape management of the glass sheet is important.

The glass sheet 12 in the present embodiment desirably has a thermal expansion coefficient of from 70 to $100\times10^{-7}/°$ C. at from 30° C. to 380° C. In order to suppress warpage after forming or at the time of chemical strengthening, it is preferable to decrease the thermal expansion coefficient. However, when the thermal expansion coefficient is not compatible with the peripheral materials, a problem, such as coming off of the glass substrate, may occur. For example, when the glass substrate is used as a cover glass for a foldable display, there is a metal or an organic material, such as an adhesive, around the glass substrate. If the thermal expansion coefficient of the glass substrate does not match that of the metal or the organic material, the glass substrate comes off when the glass substrate is bonded to the peripheral materials using an organic adhesive. With an object to make the thermal expansion coefficient of the glass substrate more easily match that of the peripheral materials, to increase the thermal expansion coefficient of the glass in the present invention, it is sufficient that the content of alkali metal oxide components or alkaline earth metal oxide components is increased, or the content of $SiO_2$ or $Al_2O_3$ is decreased. To decrease the thermal expansion coefficient, it is sufficient that the content of alkali metal oxide components or alkaline earth metal oxide components is decreased, or the content of $SiO_2$ or $Al_2O_3$ is increased.

It is more preferable that the glass sheet 12 in the present embodiment desirably has a thermal expansion coefficient of from 75 to $92\times10^{-7}/°$ C. at from 30° C. to 380° C. When the thermal expansion is relatively small, thermal deformation in a high-temperature step of strengthening the glass sheet for chemical strengthening is small. Therefore, it is possible to suppress contact with a jig or the like for holding the glass in the chemical strengthening step or an increase in local warpage after strengthening due to partial remaining of a molten salt, such as high-temperature potassium nitrate.

While the shape of the glass sheet 12 is not particularly limited, the glass sheet 12 has a rectangular shape in the present embodiment. An example of the size of the glass sheet 12 is 150 mm×150 mm to 1100 mm×1300 mm. The glass sheet 12 in the present embodiment has a long side 12x and a short side 12y, the length of the long side 12x being 400 mm or 500 mm, and the length of the short side 12y being 300 mm or 400 mm. Note that in the present glass sheet 12, the direction in which the long side 12x extends coincides with a sheet drawing direction (longitudinal direction of the glass ribbon 5) in the forming step P1 to the cooling step P3 described above. Also, as described above, even in the case where the band-shaped glass film 2 from which the non-effective portions 5b have been removed is wound into a roll shape and then the band-shaped glass film 2 unwound from the roll is cut to obtain the glass sheet 12, the direction in which the long side 12x of the glass sheet 12 extends coincides with the sheet drawing direction.

Note that when the width of the glass ribbon 5 (band-shaped glass film 2) to be formed is sufficiently wide, the glass sheet 12 may be collected from the band-shaped glass film 2 such that the direction in which the short side 12y of the glass sheet 12 extends coincides with the sheet drawing direction.

The thickness of the glass sheet 12 is 0.1 mm or less, preferably from 0.01 mm to 0.095 mm, more preferably from 0.02 mm to 0.085 mm, and still more preferably from 0.025 mm to 0.075 mm. For further thinning, the thickness of the glass sheet 12 can be 0.065 mm or less, 0.055 mm or less, or 0.05 mm or less. On the other hand, the lower limit of the thickness of the glass sheet 12 is 0.025 mm or more, and more preferably 0.03 mm or more. If the glass sheet 12 is too thin, the deflection of the glass sheet 12 becomes too large, making it difficult to secure strength. Moreover, if the glass sheet 12 is excessively too thin, the difference between the thickness of the glass pool portions at the end portions of the glass sheet 12 and the thickness of the central portion of the glass sheet 12 to be turned into a product becomes large at the time of forming, making it more difficult to improve the sheet thickness distribution of the glass sheet 12 after forming and suppress the warpage.

In particular, when the glass sheet 12 is thin, the difference in sheet thickness between the non-effective portions 5*b* at both widthwise end portions of the band-shaped glass film 2 and the effective portion 5*a* at the widthwise central portion thereof, which is generated at the time of overflow forming, becomes more prominent. Therefore, warpage is more likely to be induced at or near the peripheral edge portion of the glass sheet 12, in particular at or near the corner portions. As it becomes difficult to remove the warpage and thus the effective portion decreases, the warpage shape degrades in the chemical strengthening treatment at a high temperature of, for example, 360° C. or more, or breakage occurs in the treatment step, which greatly reduce the efficiency of product collection as the glass for chemical strengthening. Moreover, it becomes very difficult to maintain the glass shape when the glass sheet for chemical strengthening 12 is subjected to the chemical strengthening step, further inducing an increase in the glass deformation.

In the present embodiment, the glass sheet 12 as a whole has a substantially uniform thickness. The "substantially uniform thickness" herein means deviation in the thickness of the glass sheet 12 is ±20% or less. Note that the deviation in the thickness of the glass sheet 12 is preferably ±10%/9 or less, more preferably ±5% or less.

The glass sheet 12 includes warpage, and unevenness is formed on the one main surface 12*a* and the another main surface 12*b* due to warpage. Thus, regardless of which of the first placement form and the second placement form is adopted, the glass sheet 12 includes a part at which the glass sheet 12 is lifted up from the horizontal surface mentioned above. Here, XY coordinates are adopted as illustrated in FIGS. 3 and 4 under each of the first and second placement forms. That is, one of the four corners of the glass sheet 12 is defined as an origin S, an X-axis [mm] is set in a direction in which the long side 12*x* extends, and a Y-axis [mm] is set in a direction in which the short side 12*y* extends. Accordingly, in consideration of the lengths of the long side 12*x* and the short side 12*y* (400 mm×300 mm or 500 mm×400 mm) described above in the present embodiment, the respective coordinates of the points A, B, and C illustrated in both figures are A (400, 0), B (400, 300), and C (0, 300), or A (500, 0), B (500, 400), and C (0, 400).

Furthermore, the glass sheet 12 is defined as in the following (1) to (8).

(1) The thickness of the glass sheet 12 is defined as t [mm].

(2) When the first placement form (FIG. 3) is adopted, a position having the highest height from the horizontal surface in the glass sheet 12 is defined as a first peak position D1.

(3) A height of the glass sheet 12 from the horizontal surface at the first peak position D1 is defined as $W_{1MAX}$ [mm].

(4) When the second placement form (FIG. 4) is adopted, a position having the highest height from the horizontal surface in the glass sheet 12 is defined as a second peak position D2.

(5) A height of the glass sheet 12 from the horizontal surface at the second peak position D2 is defined as $W_{2MAX}$ [mm].

(6) A part (the cross-hatched part having a width L1 illustrated in FIGS. 3 and 4) having a width of 10 mm along a peripheral edge (edge) of the glass sheet 12 is defined as a peripheral edge portion 12*e*.

(7) When the first placement form (FIG. 3) is adopted, a height at a position D3 (hereinafter referred to as the first peripheral edge peak position D3) having the highest height from the horizontal surface in the peripheral edge portion 12*e* is defined as $W_{1OUT}$ [mm].

(8) When the second placement form (FIG. 4) is adopted, a height at a position D4 (hereinafter referred to as the second peripheral edge peak position D4) having the highest height from the horizontal surface in the peripheral edge portion 12*e* is defined as $W_{2OUT}$ [mm].

In the present embodiment, the height at respective positions, including the first peak position D1 and the second peak position D2 mentioned above, of an upper surface of the glass sheet 12 in a state where the glass sheet 12 is horizontally placed is measured using a 1313SK type glass substrate warpage measuring device manufactured by Apollo Precision Inc. as a measuring device. Note that the first peak position D1, the second peak position D2, the first peripheral edge peak position D3, and the second peripheral edge peak position D4 illustrated in FIGS. 3 and 4 are merely examples of these positions.

Here, a large number of measurement positions at which height measurement is performed by the above-mentioned measuring device are scattered on the XY coordinates. In other words, the height is not measured for each and every position on the glass sheet 12. Therefore, the first peak position D1 or the second peak position D2 merely means the position having the highest height of the measured positions. In other words, there is a high probability that there is a positional deviation between the position having the truly highest height (the position protruding upward the most of all the positions on the glass sheet 12) and the first peak position D1 or the second peak position D2. Therefore, there is a high probability that there is a difference in value between the height at the position having the truly highest height and the value of $W_{1MAX}$ or the value of $W_{2MAX}$ mentioned above. Therefore, it is necessary to narrow the interval between adjacent measurement positions to such an extent that this difference in value is negligible. The interval between adjacent measurement positions in each of the X-axis direction and the Y-axis direction is preferably 100 mm or less, more preferably 50 mm or less, more preferably 30 mm or less, still more preferably 20 mm or less, and most preferably 10 mm or less or 5 mm or less. However, from the viewpoint of shortening the time required for measurement, the interval between adjacent measurement positions may be widened as much as possible as long as necessary accuracy is achieved.

Under the above-mentioned definitions (1) to (8), in the present glass sheet 12, as illustrated in FIG. 3, the first peak position D1 is present in a part inside the peripheral edge portion 12*e* of the glass sheet 12 (that is, a region closer to the center than the peripheral edge portion 12*e* in plan view).

That is, in a case where the coordinates of the first peak position D1 are D1 $(X_1, Y_1)$, $10<X_1<390$ is satisfied and $10<Y_1<290$ is satisfied when the long side $12x$ is 400 mm and the short side $12y$ is 300 mm. Also, $10<X_1<490$ is satisfied and $10<Y_1<390$ is satisfied when the long side $12x$ is 500 mm and the short side $12y$ is 400 mm. Note that when a part (the hatched part having a width L2 illustrated in FIGS. 3 and 4) having a width of 50 mm along the peripheral edge of the glass sheet 12 is defined as a second peripheral edge portion 12f, the first peak position D1 is preferably present in a part inside the second peripheral edge portion 12f of the glass sheet 12. That is, it is preferable that $50<X_1<350$ is satisfied and $50<Y_1<250$ is satisfied when the long side $12x$ is 400 mm and the short side $12y$ is 300 mm. It is also preferable that $50<X_1<450$ is satisfied and $50<Y_1<350$ is satisfied when the long side $12x$ is 500 mm and the short side $12y$ is 400 mm. Accordingly, the top portion of the warpage having the highest height is present further inside the glass sheet. Therefore, when the glass sheet is cut into individual small substrates in a subsequent step using diamond scribing, bending stress, laser, or the like in order to use the glass sheet for, for example, a smaller-sized foldable device, defects, such as breakage occurring at or near the end surface serving as a cutting start point and cutting error due to laser focus abnormality, are less likely to be induced.

Also, in the present glass sheet 12, it is preferable that respective relationships of $t^2/W_{1OUT}>0.005$, $W_{1OUT}\leq0.20$ mm (preferably $W_{1OUT}\leq0.10$ mm), $W_{1OUT}/t<5$, and $W_{1MAX}/t<15$ are satisfied.

Furthermore, in the present glass sheet 12, as illustrated in FIG. 4, the second peak position D2 is present in the part inside the peripheral edge portion 12e of the glass sheet 12. That is, in a case where the coordinates of the second peak position D2 are D2 $(X_2, Y_2)$, $10<X_2<390$ is satisfied and $10<Y_2<290$ is satisfied when the long side $12x$ is 400 mm and the short side $12y$ is 300 mm. Also, $10<X_2<490$ is satisfied and $10<Y_2<390$ is satisfied when the long side $12x$ is 500 mm and the short side $12y$ is 400 mm. Note that the second peak position D2 is preferably present in the part inside the second peripheral edge portion 12f of the glass sheet 12. That is, when the long side $12x$ is 400 mm and the short side $12y$ is 300 mm, it is preferable that $50<X_2<350$ is satisfied and $50<Y_2<250$ is satisfied. It is preferable that $50<X_{2<450}$ is satisfied and $50<Y_2<350$ is satisfied when the long side $12x$ is 500 mm and the short side $12y$ is 400 mm.

In addition, in the present glass sheet 12, it is preferable that respective relationships of $t^2/W_{2OUT}>0.005$, $W_{2OUT}\leq0.20$ mm (preferably $W_{2OUT}\leq0.10$ mm), $W_{2OUT}/t<5$, and $W_{2MAX}/t<15$ are satisfied.

With the present glass sheet 12, it is possible to avoid breakage due to warpage as much as possible in the manufacturing steps that the glass sheet 12 undergoes before becoming a strengthened glass sheet.

Cutting Out Step

The cutting out step is performed on the glass sheet 12 prepared in the preparation step. Since the cutting out step can be performed by a known method, detailed description thereof will be omitted. When the cutting out step is completed, a product-sized glass sheet (for example, a glass sheet having a size suitable for a screen of a smartphone or a tablet PC) is obtained. Note that one product-sized glass sheet may be cut out from one glass sheet 12, or a plurality of the product-sized glass sheets may be cut out from one glass sheet 12.

Strengthening Step

In the strengthening step, the product-sized glass sheet obtained in the cutting out step is chemically strengthened to obtain a strengthened glass sheet with a compressive stress layer (a layer on which compressive stress acts) formed on each of the front surface side and the back surface side. Since specific modes of chemical strengthening are known, detailed description thereof will be omitted. Thus, the strengthening step is completed and a strengthened glass sheet is manufactured.

Example 1

As a first example, glass sheets for chemical strengthening (Examples 1 to 18 and Comparative Examples 1 to 4) having the parameters shown in [Table 1] to [Table 4] below were respectively prepared. The rates of occurrence of breakage (breakage rate) in the glass sheets due to warpage in manufacturing steps that the glass sheets undergo before becoming strengthened glass sheets were determined. As the manufacturing steps, specifically, a cutting out step of cutting out a glass sheet for chemical strengthening from a glass film original sheet, a cleaning step after the cutting, and an appearance inspection step were performed. Note that the glass sheet for chemical strengthening in the example is a glass sheet containing, in mol %, 61.6% of $SiO_2$, 18.0% of $Al_2O_3$, 0.5% of $B_2O_3$, 3.0% of MgO, 14.5% of $Na_2O$, 2.0% of $K_2O$ and 0.4% of $SnO_2$, having a strain point of 564° C. and a thermal expansion coefficient of $91\times10^{-7}$/° C. at from 30° C. to 380° C., and formed by an overflow down-draw method. In the glass sheets for chemical strengthening in the examples, the thermal history at the time of annealing, the cutting out position from the glass film original sheet, and the like are each adjusted.

The parameters shown in [Table 1] to [Table 4] are all the same indexes as the parameters described in the above-mentioned embodiment. Also, the "first surface" in [Table 1] to [Table 4] indicates a case where the glass sheet is placed on a horizontal surface with the guaranteed surface (one main surface) facing upward (a case where the first placement form is adopted). On the other hand, the "second surface" indicates a case where the glass sheet is placed on the horizontal surface with the non-guaranteed surface (the another main surface) facing upward (a case where the second placement form is adopted). Furthermore, regarding the item "Maximum value is inside", "good" means that the first peak position (second peak position) is present in the part inside the peripheral edge portion of the glass sheet, and "poor" means that the first peak position (second peak position) is present in the peripheral edge portion of the glass sheet. Here, the height from the horizontal surface of the glass sheet (long side–short side: 400 mm×300 mm) was measured at respective coordinates at which straight lines parallel to the Y-axis and straight lines parallel to the X-axis intersect each other, the straight lines being set at intervals of 5 mm on the XY coordinates mentioned above. In this first example, the case where the peripheral edge portion of the glass sheet had a width of 10 mm was considered.

Accordingly, when at least one of the condition that the X-coordinate of the first peak position is 10 mm or lower or 390 mm or higher or the condition that the Y-coordinate of the first peak position is 10 mm or lower or 290 mm or higher is satisfied, the item of "Maximum value is inside" for the first peak position is "poor". When neither condition is satisfied, the item of "Maximum value is inside" for the first peak position is "good". Similarly, when at least one of the condition that the X-coordinate of the second peak position is 10 mm or lower or 390 mm or higher or the condition that the Y-coordinate of the second peak position is 10 mm or lower or 290 mm or higher is satisfied, the item of time when the cleaning step among the above-mentioned manufacturing steps was completed was grasped by the appearance inspection step. The proportion of the number of broken glass sheets among the large number of glass sheets was calculated to determine the breakage rate. By a similar method, the breakage rate was determined for Examples 2 to 18 and Comparative Examples 1 to 4 as well. Note that the number of glass sheets for chemical strengthening manufactured under the same conditions as in each Example and each Comparative Example was 200 to 500 (the number of glass sheets varies depending on the Examples and the Comparative Examples).

TABLE 1

|  |  |  | Example 1 | Example 2 | Example 3 | Example 4 | Example 5 |
|---|---|---|---|---|---|---|---|
| Glass size |  | Long side X (mm) | 400 | 400 | 400 | 400 | 400 |
|  |  | Short side Y (mm) | 300 | 300 | 300 | 300 | 300 |
| Sheet thickness t (mm) |  |  | 0.10 | 0.07 | 0.05 | 0.05 | 0.05 |
| First surface height | Maximum position | $X_1$ (mm) | 55 | 185 | 105 | 255 | 105 |
|  |  | $Y_1$ (mm) | 255 | 145 | 255 | 255 | 105 |
|  | Maximum value | $W_{1MAX}$ (mm) | 0.182 | 0.144 | 0.198 | 0.193 | 0.179 |
|  |  | Maximum value is inside | Good | Good | Good | Good | Good |
|  | Peripheral edge portion maximum value | $W_{1OUT}$ (mm) | 0.081 | 0.093 | 0.065 | 0.092 | 0.144 |
| First surface | $t^2/W_{1OUT}$ |  |  | 0.123 | 0.053 | 0.038 | 0.027 | 0.017 |
|  | $W_{1OUT}/t$ |  |  | 1.8 | 1.3 | 1.3 | 1.8 | 2.9 |
|  | $W_{1MAX}/t$ |  |  | 0.8 | 2.1 | 4.0 | 3.9 | 3.6 |
| Second surface height | Maximum position | $X_2$ (mm) | 55 | 165 | 105 | 255 | 305 |
|  |  | $Y_2$ (mm) | 205 | 145 | 205 | 255 | 55 |
|  | Maximum value | $W_{2MAX}$ (mm) | 0.119 | 0.111 | 0.096 | 0.200 | 0.169 |
|  |  | Maximum value is inside | Good | Good | Good | Good | Good |
|  | Peripheral edge portion maximum value | $W_{2OUT}$ (mm) | 0.079 | 0.088 | 0.065 | 0.119 | 0.060 |
| Second surface | $t^2/W_{2OUT}$ |  |  | 0.127 | 0.056 | 0.038 | 0.021 | 0.042 |
|  | $W_{2OUT}/t$ |  |  | 0.8 | 1.3 | 1.3 | 2.4 | 1.2 |
|  | $W_{2MAX}/t$ |  |  | 1.2 | 1.6 | 1.9 | 4.0 | 3.4 |
| Breakage rate |  | (%) | 0.0 | 0.0 | 0.0 | 0.0 | 0.0 | of "Maximum value is inside" for the second peak position is "poor". When neither condition is satisfied, the item of "Maximum value is inside" for the second peak position is "good".

Figure 5:
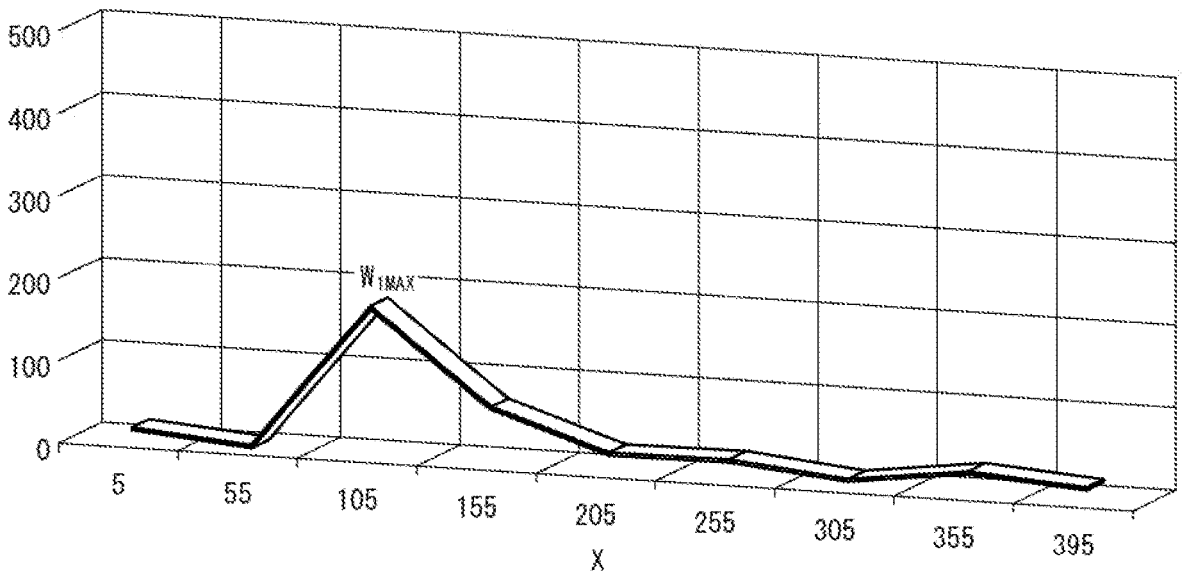
FIG. 5 is a diagram illustrating a warpage distribution at Y=105 when a first placement form is adopted in Example 5.

A specific method for determining the breakage rate will be described with reference to Example 1 as an example. First, a large number of glass sheets for chemical strengthening manufactured under the same conditions as those of the glass sheets of Example 1 were prepared. Then, for each glass sheet, the presence or absence of breakage at the point From the breakage rates shown in [Table 1], it can be seen that in Examples 1 to 5 in which the first peak position was present in the part inside the peripheral edge portion of the glass sheet, breakage of the glass sheet did not occur. Here FIG. 5 illustrates warpage distribution (distribution of unevenness on the guaranteed surface) at Y=105 including the first peak position when the first placement form was adopted in Example 5. Note that, in FIG. 5, heights measured (at X=5, 55, 105, 155, 205, 255, 305, 355, and 395 are extracted and illustrated.

TABLE 2

| | | | Example 6 | Example 7 | Example 8 | Example 9 | Comparative Example 1 | Comparative Example 2 |
|---|---|---|---|---|---|---|---|---|
| Glass size | | Long side X (mm) | 400 | 400 | 400 | 400 | 400 | 400 |
| | | Short side Y (mm) | 300 | 300 | 300 | 300 | 300 | 300 |
| Sheet thickness t (mm) | | | 0.04 | 0.04 | 0.04 | 0.04 | 0.04 | 0.04 |
| First surface height | Maximum position | $X_1$ (mm) | 105 | 155 | 105 | 155 | 105 | 105 |
| | | $Y_1$ (mm) | 55 | 255 | 205 | 205 | 5 | 295 |
| | Maximum value | $W_{1MAX}$ (mm) | 0.177 | 0.241 | 0.144 | 0.215 | 0.225 | 0.208 |
| | | Maximum value is inside | Good | Good | Good | Good | Poor | Poor |
| | Peripheral edge portion maximum value | $W_{1OUT}$ (mm) | 0.043 | 0.117 | 0.093 | 0.178 | 0.225 | 0.208 |
| First surface | $t^2/W_{1OUT}$ | | 0.037 | 0.014 | 0.017 | 0.009 | 0.007 | 0.008 |
| | $W_{1OUT}/t$ | | 1.1 | 2.9 | 2.3 | 4.5 | 5.6 | 5.2 |
| | $W_{1MAX}/t$ | | 4.4 | 6.0 | 3.6 | 5.4 | 5.6 | 5.2 |
| Second surface height | Maximum position | $X_2$ (mm) | 205 | 255 | 255 | 205 | 205 | 105 |
| | | $Y_2$ (mm) | 205 | 155 | 5 | 255 | 5 | 295 |
| | Maximum value | $W_{2MAX}$ (mm) | 0.154 | 0.152 | 0.175 | 0.118 | 0.347 | 0.187 |
| | | Maximum value is inside | Good | Good | Poor | Good | Poor | Poor |
| | Peripheral edge portion maximum value | $W_{2OUT}$ (mm) | 0.107 | 0.064 | 0.175 | 0.053 | 0.347 | 0.187 |
| Second surface | $t^2/W_{2OUT}$ | | 0.015 | 0.025 | 0.009 | 0.030 | 0.005 | 0.009 |
| | $W_{2OUT}/t$ | | 2.7 | 1.6 | 4.4 | 1.3 | 8.7 | 4.7 |
| | $W_{2MAX}/t$ | | 3.9 | 3.8 | 4.4 | 3.0 | 8.7 | 4.7 |
| Breakage rate | (%) | | 0.0 | 0.0 | 0.8 | 1.5 | 11.8 | 12.0 |

From the breakage rates shown in [Table 2], it can be seen that, of Examples 6 to 9 in which the first peak position was present in the part inside the peripheral edge portion of the glass sheet, breakage of the glass sheet did not occur at all in Examples 6 and 7. In addition, it can be seen that even in Examples 8 and 9 in which breakage occurred, the breakage rates of the glass sheet were greatly suppressed compared to those of Comparative Examples 1 and 2 in which the first peak position was present in the peripheral edge portion of the glass sheet.

TABLE 3

| | | | Example 10 | Example 11 | Example 12 | Example 13 | Comparative Example 3 |
|---|---|---|---|---|---|---|---|
| Glass size | | Long side X (mm) | 400 | 400 | 400 | 400 | 400 |
| | | Short side Y (mm) | 300 | 300 | 300 | 300 | 300 |
| Sheet thickness t (mm) | | | 0.035 | 0.035 | 0.035 | 0.035 | 0.035 |
| First surface height | Maximum position | $X_1$ (mm) | 205 | 305 | 155 | 205 | 255 |
| | | $Y_1$ (mm) | 205 | 205 | 205 | 205 | 295 |
| | Maximum value | $W_{1MAX}$ (mm) | 0.205 | 0.273 | 0.319 | 0.332 | 0.156 |
| | | Maximum value is inside | Good | Good | Good | Good | Poor |
| | Peripheral edge portion maximum value | $W_{1OUT}$ (mm) | 0.076 | 0.170 | 0.179 | 0.175 | 0.156 |
| First surface | $t^2/W_{1OUT}$ | | 0.016 | 0.007 | 0.007 | 0.007 | 0.008 |
| | $W_{1OUT}/t$ | | 2.2 | 4.9 | 5.1 | 5.0 | 4.5 |
| | $W_{1MAX}/t$ | | 5.9 | 7.8 | 9.1 | 9.5 | 4.5 |
| Second surface height | Maximum position | $X_2$ (mm) | 205 | 255 | 255 | 105 | 205 |
| | | $Y_2$ (mm) | 205 | 205 | 55 | 155 | 295 |
| | Maximum value | $W_{2MAX}$ (mm) | 0.225 | 0.286 | 0.218 | 0.274 | 0.283 |
| | | Maximum value is inside | Good | Good | Good | Good | Poor |
| | Peripheral edge portion maximum value | $W_{2OUT}$ (mm) | 0.155 | 0.074 | 0.128 | 0.152 | 0.283 |
| Second surface | $t^2/W_{2OUT}$ | | 0.008 | 0.017 | 0.010 | 0.008 | 0.004 |
| | $W_{2OUT}/t$ | | 4.4 | 2.1 | 3.7 | 4.3 | 8.1 |
| | $W_{2MAX}/t$ | | 6.4 | 8.2 | 6.2 | 7.8 | 8.1 |
| Breakage rate | (%) | | 0.0 | 0.0 | 0.0 | 0.0 | 3.0 |

From the breakage rates shown in [Table 3], it can be seen that in Examples 10 to 13 in which the first peak position was present in the part inside the peripheral edge portion of the glass sheet, breakage of the glass sheet did not occur at all. On the other hand, it can be seen that in Comparative Example 3 in which the first peak position was present in the peripheral edge portion of the glass sheet, breakage of the glass sheet occurred even though the sheet thickness was the same as that in Examples 10 to 13.

0.20 mm, $t^2/W_{2OUT}>0.005$, $W_{2OUT}/t<5$, and $W_{2MAX}/t<15$ were not satisfied. Note that in Example 18, the second peak position was present in the peripheral edge portion of the glass sheet. Based on the above, it can be seen that, of the glass sheets whose thickness has been thinned to 0.03 mm, the breakage rate tends to be low in the glass sheets satisfying more of the relationships listed above.

[Table 5] below shows the height [μm] of the glass sheet from the horizontal surface measured at respective coordi-

TABLE 4

| | | | Example 14 | Example 15 | Example 16 | Example 17 | Example 18 | Comparative Example 4 |
|---|---|---|---|---|---|---|---|---|
| Glass size | | Long side X (mm) | 400 | 400 | 400 | 400 | 400 | 400 |
| | | Short side Y (mm) | 300 | 300 | 300 | 300 | 300 | 300 |
| Sheet thickness t (mm) | | | 0.03 | 0.03 | 0.03 | 0.03 | 0.03 | 0.03 |
| First surface height | Maximum position | $X_1$ (mm) | 105 | 55 | 155 | 155 | 105 | 205 |
| | | $Y_1$ (mm) | 55 | 205 | 205 | 255 | 255 | 295 |
| | Maximum value | $W_{1MAX}$ (mm) | 0.220 | 0.309 | 0.216 | 0.321 | 0.315 | 0.464 |
| | | Maximum value is inside | Good | Good | Good | Good | Good | Poor |
| | Peripheral edge portion maximum value | $W_{1OUT}$ (mm) | 0.079 | 0.146 | 0.161 | 0.094 | 0.111 | 0.464 |
| First surface | $t^2/W_{1OUT}$ | | 0.011 | 0.006 | 0.006 | 0.010 | 0.008 | 0.002 |
| | $W_{1OUT}/t$ | | 2.6 | 4.9 | 5.4 | 3.1 | 3.7 | 15.5 |
| | $W_{1MAX}/t$ | | 7.3 | 10.3 | 7.2 | 10.7 | 10.5 | 15.5 |
| Second surface height | Maximum position | $X_2$ (mm) | 155 | 205 | 305 | 105 | 5 | 55 |
| | | $Y_2$ (mm) | 255 | 55 | 205 | 55 | 295 | 295 |
| | Maximum value | $W_{2MAX}$ (mm) | 0.241 | 0.331 | 0.186 | 0.406 | 0.479 | 0.316 |
| | | Maximum value is inside | Good | Good | Good | Good | Poor | Poor |
| | Peripheral edge portion maximum value | $W_{2OUT}$ (mm) | 0.127 | 0.052 | 0.098 | 0.233 | 0.479 | 0.316 |
| Second surface | $t^2/W_{2OUT}$ | | 0.007 | 0.017 | 0.009 | 0.004 | 0.002 | 0.003 |
| | $W_{2OUT}/t$ | | 4.2 | 1.7 | 3.3 | 7.8 | 16.0 | 10.5 |
| | $W_{2MAX}/t$ | | 8.0 | 11.0 | 6.2 | 13.5 | 16.0 | 10.5 |
| Breakage rate | (%) | | 0.8 | 1.5 | 1.0 | 2.0 | 2.5 | 31.8 |

From the breakage rates shown in [Table 4], it can be seen that although it was difficult to completely suppress breakage in the steps when the sheet thickness was as very thin as 0.03 mm, the breakage rate of the glass sheet was greatly suppressed in Examples 14 to 18 in which the first peak position was present in the part inside the peripheral edge portion of the glass sheet as compared with Comparative Example 4 in which the first peak position was present in the peripheral edge portion of the glass sheet.

Figure 6:
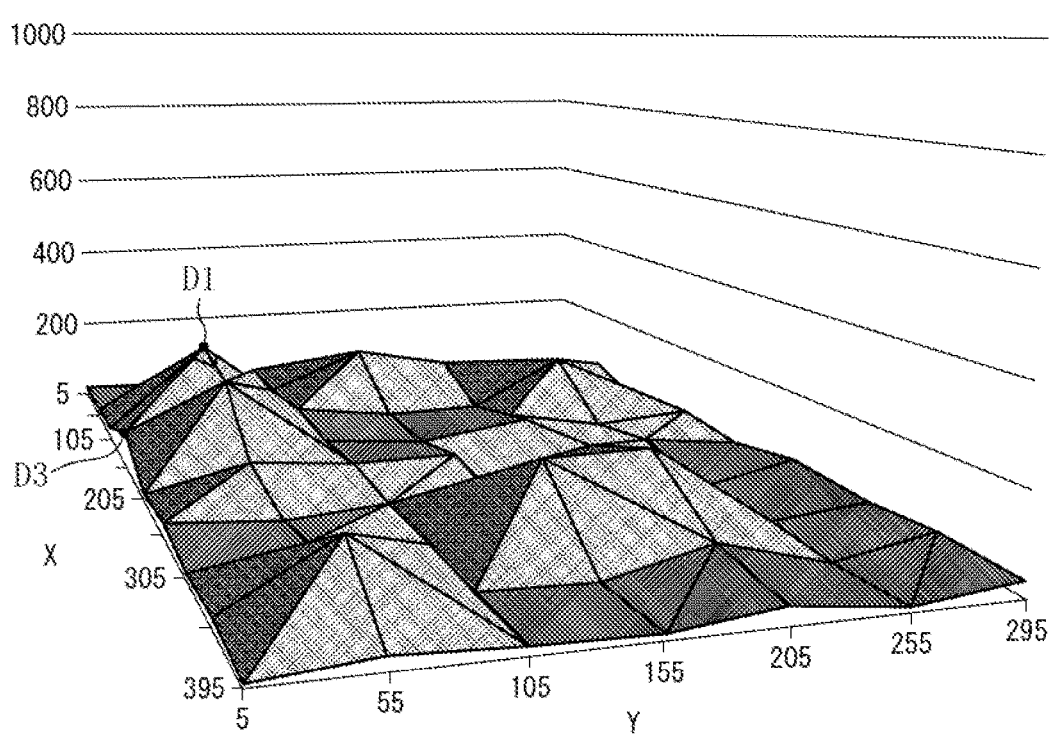
FIG. 6 is a diagram illustrating a warpage distribution when the first placement form is adopted in Example 14.
Figure 7:
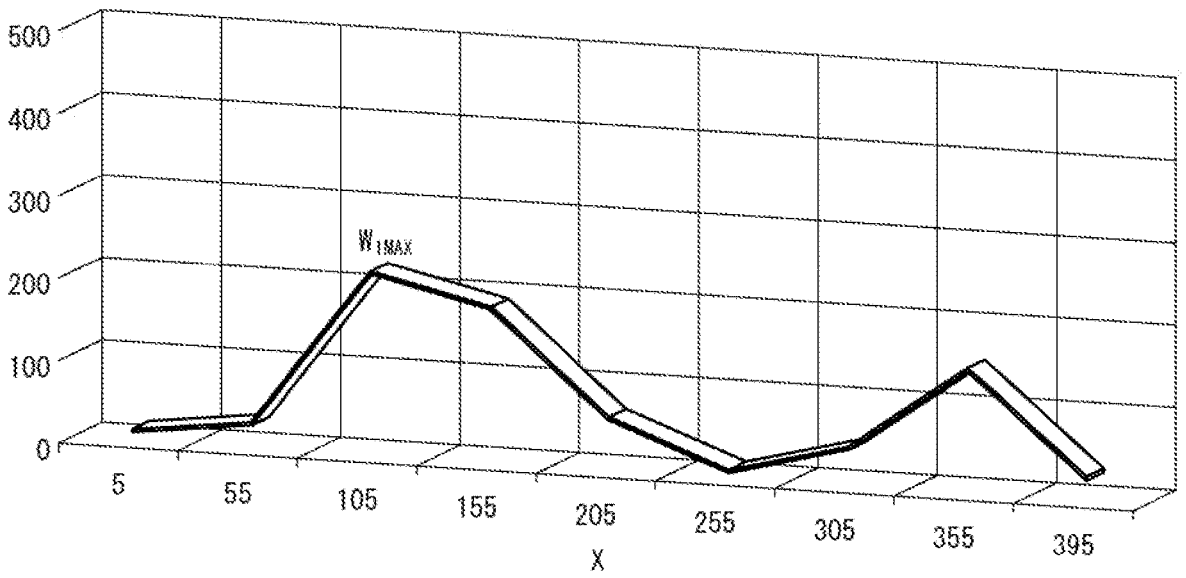
FIG. 7 is a diagram illustrating a warpage distribution at Y=55 when the first placement form is adopted in Example 14.

Here, in Examples 14 and 15, the condition that the first peak position is present in the part inside the peripheral edge portion of the glass sheet was satisfied and, in addition, all of the relationships listed below were satisfied: $W_{1OUT}<0.20$ mm, $t^2/W_{1OUT}>0.005$, $W_{1OUT}/t<5$, $W_{1MAX}/t<15$, $W_{2OUT}\leq0.20$ mm, $t^2/W_{2OUT}>0.005$, $W_{2OUT}/t<5$, and $W_{2MAX}/t<15$. On the other hand, in Example 16, among the relationships listed above, only the relationship of $W_{1OUT}/t<5$ was not satisfied. In Example 17, the three relationships of $W_{2OUT}<0.20$ mm, $t^2/W_{2OUT}>0.005$, and $W_{2OUT}/t<5$ were not satisfied. In Example 18, the four relationships of $W_{2OUT}$ nates shown in the same table when the first placement form was adopted in Example 14. FIG. 6 illustrates a warpage distribution (distribution of unevenness on the guaranteed surface) in the same case. Note that in [Table 5] and [Table 6] to [Table 16] described later, and in FIG. 6 and FIGS. 8 to 18 referred to later, heights measured at some coordinates are extracted and illustrated. Specifically, heights measured at respective coordinates at which nine straight lines parallel to the Y-axis represented by X=5, 55, 105, 155, 205, 255, 305, 355, and 395, respectively, and seven straight lines parallel to the X-axis represented by Y=5, 55, 105, 155, 205, 255, and 295, respectively, intersect each other are extracted and illustrated. Furthermore, FIG. 7 illustrates a warpage distribution (distribution of unevenness on the guaranteed surface) at Y=55 including the first peak position. Also in FIG. 7, heights measured at X=5, 55, 105, 155, 205, 255, 305, 355, and 395 are extracted and illustrated. In the same case, a mean value of the heights was 45 μm (0.045 mm). A standard deviation of the heights was 0.050.

TABLE 5

| Example 14<br>First surface | | Y = 5 | Y = 55 | Y-Coordinate<br>Y = 105 | Y = 155 | Y = 205 | Y = 255 | Y = 295 |
|---|---|---|---|---|---|---|---|---|
| X-Coordinate | X = 5 | 16 | 12 | 38 | 0 | 17 | 19 | 11 |
| | X = 55 | 11 | 30 | 26 | 130 | 85 | 43 | 52 |
| | X = 105 | 25 | $W_{1MAX}$ 220 | 43 | 15 | 22 | 137 | 0 |
| | X = 155 | $W_{1OUT}$ 79 | 188 | 25 | 15 | 61 | 16 | 37 |
| | X = 205 | 10 | 63 | 39 | 42 | 82 | 44 | 17 |
| | X = 255 | 26 | 9 | 24 | 2 | 113 | 12 | 47 |
| | X = 305 | 10 | 46 | 22 | 173 | 178 | 1 | 32 |
| | X = 355 | 21 | 150 | 17 | 11 | 67 | 5 | 44 |
| | X = 395 | 7 | 28 | 17 | 12 | 35 | 7 | 32 |

Figure 8:
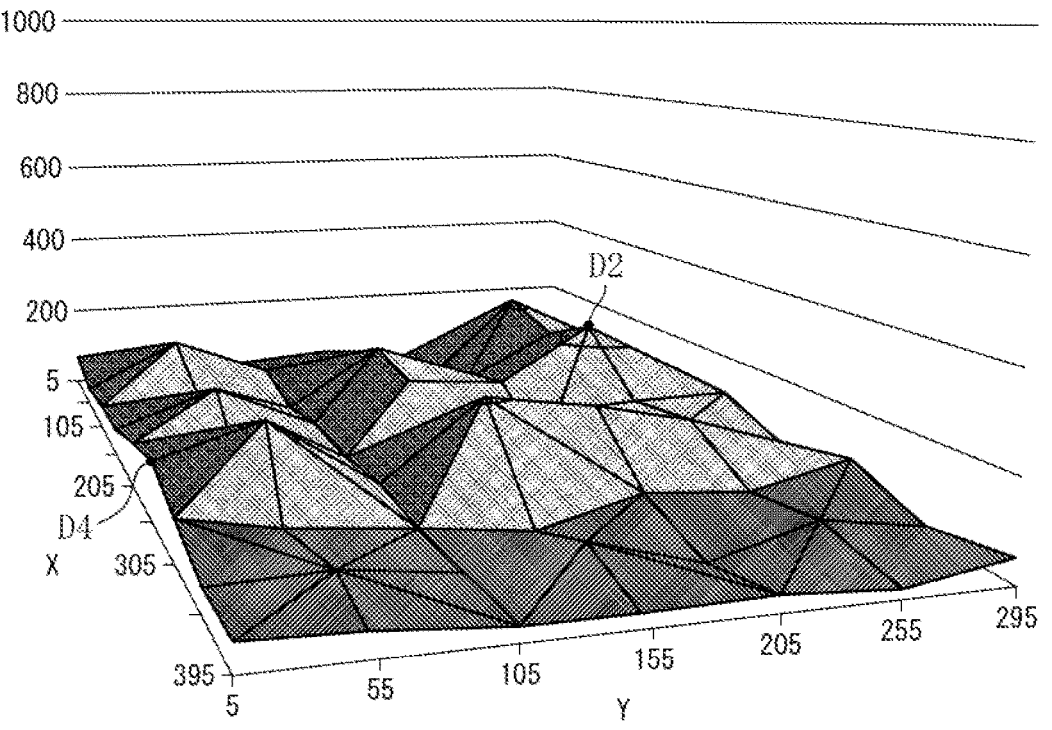
FIG. 8 is a diagram illustrating a warpage distribution when a second placement form is adopted in Example 14.

[Table 6] below shows the height [μm] of the glass sheet from the horizontal surface measured at respective coordinates shown in the same table when the second placement form was adopted in Example 14. FIG. 8 illustrates a warpage distribution (distribution of unevenness on the non-guaranteed surface) in the same case. In the same case, a mean value of the heights was 69 μm (0.069 mm). A standard deviation of the heights was 0.058.

TABLE 6

| Example 14<br>Second surface | | Y = 5 | Y = 55 | Y-Coordinate<br>Y = 105 | Y = 155 | Y = 205 | Y = 255 | Y = 295 |
|---|---|---|---|---|---|---|---|---|
| X-Coordinate | X = 5 | 67 | 14 | 25 | 41 | 17 | 55 | 6 |
| | X = 55 | 32 | 150 | 54 | 46 | 19 | 217 | 28 |
| | X = 105 | 50 | 40 | 19 | 159 | 57 | 170 | 108 |
| | X = 155 | 58 | 140 | 38 | 130 | 109 | $W_{2MAX}$ 241 | 55 |
| | X = 205 | 93 | 4 | 27 | 21 | 10 | 106 | 116 |
| | X = 255 | $W_{2OUT}$ 127 | 194 | 38 | 212 | 176 | 127 | 46 |
| | X = 305 | 90 | 51 | 30 | 3 | 57 | 38 | 93 |
| | X = 355 | 51 | 61 | 27 | 66 | 0 | 60 | 29 |
| | X = 395 | 55 | 48 | 28 | 26 | 31 | 15 | 52 |

Figure 9:
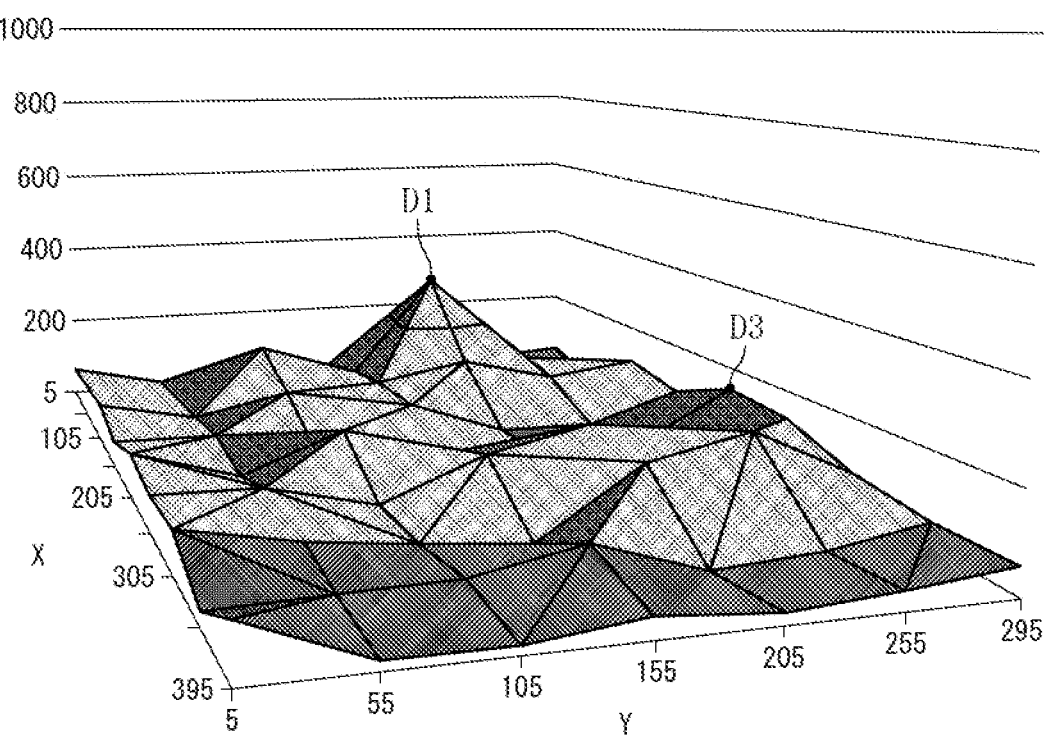
FIG. 9 is a diagram illustrating a warpage distribution when the first placement form is adopted in Example 15.

[Table 7] below shows the height [μm] of the glass sheet from the horizontal surface measured at respective coordinates shown in the same table when the first placement form was adopted in Example 15. FIG. 9 illustrates a warpage distribution (distribution of unevenness on the guaranteed surface) in the same case. In the same case, a mean value of the heights was 63 μm (0.063 mm). A standard deviation of the heights was 0.055.

TABLE 7

| Example 15<br>First surface | | Y = 5 | Y = 55 | Y-Coordinate<br>Y = 105 | Y = 155 | Y = 205 | Y = 255 | Y = 295 |
|---|---|---|---|---|---|---|---|---|
| X-Coordinate | X = 5 | 63 | 11 | 23 | 25 | 6 | 20 | 40 |
| | X = 55 | 82 | 23 | 147 | 70 | $W_{1MAX}$ 309 | 82 | 16 |
| | X = 105 | 89 | 32 | 82 | 91 | 133 | 72 | 106 |
| | X = 155 | 55 | 51 | 6 | 88 | 12 | 7 | 82 |
| | X = 205 | 94 | 27 | 112 | 44 | 1 | 12 | $W_{1OUT}$ 146 |
| | X = 255 | 78 | 73 | 19 | 110 | 156 | 16 | 135 |
| | X = 305 | 91 | 47 | 19 | 0 | 143 | 190 | 80 |
| | X = 355 | 31 | 37 | 37 | 84 | 7 | 22 | 58 |
| | X = 395 | 111 | 16 | 16 | 40 | 21 | 36 | 57 |

Figure 10:
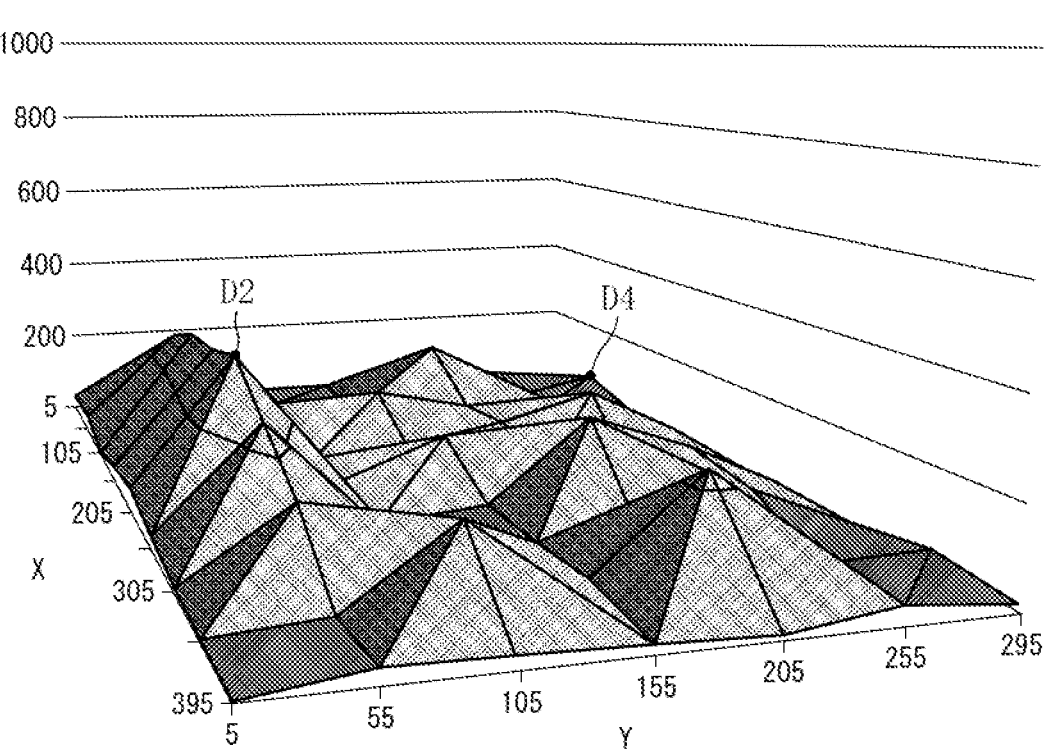
FIG. 10 is a diagram illustrating a warpage distribution when the second placement form is adopted in Example 15.

[Table 8] below shows the height [μm] of the glass sheet from the horizontal surface measured at respective coordinates shown in the same table when the second placement form was adopted in Example 15. FIG. 10 illustrates a warpage distribution (distribution of unevenness on the non-guaranteed surface) in the same case. In the same case, a mean value of the heights was 64 μm (0.064 mm). A standard deviation of the heights was 0.083.

TABLE 8

| Example 15 | | Y-Coordinate | | | | | | |
|---|---|---|---|---|---|---|---|---|
| Second surface | | Y = 5 | Y = 55 | Y = 105 | Y = 155 | Y = 205 | Y = 255 | Y = 295 |
| X- | X = 5 | 29 | 21 | 15 | 16 | 20 | 28 | 10 |
| Coordinate | X = 55 | 31 | 238 | 30 | 5 | 165 | 15 | $W_{2OUT}$ 52 |
| | X = 105 | 0 | 290 | 18 | 107 | 57 | 54 | 7 |
| | X = 155 | 27 | 299 | 17 | 16 | 72 | 135 | 19 |
| | X = 205 | 49 | $W_{2MAX}$ 331 | 37 | 120 | 4 | 5 | 10 |
| | X = 255 | 23 | 242 | 11 | 31 | 208 | 128 | 18 |
| | X = 305 | 8 | 155 | 20 | 31 | 0 | 101 | 8 |
| | X = 355 | 6 | 24 | 179 | 45 | 231 | 29 | 37 |
| | X = 395 | 3 | 32 | 24 | 18 | 9 | 37 | 14 |

Figure 11:
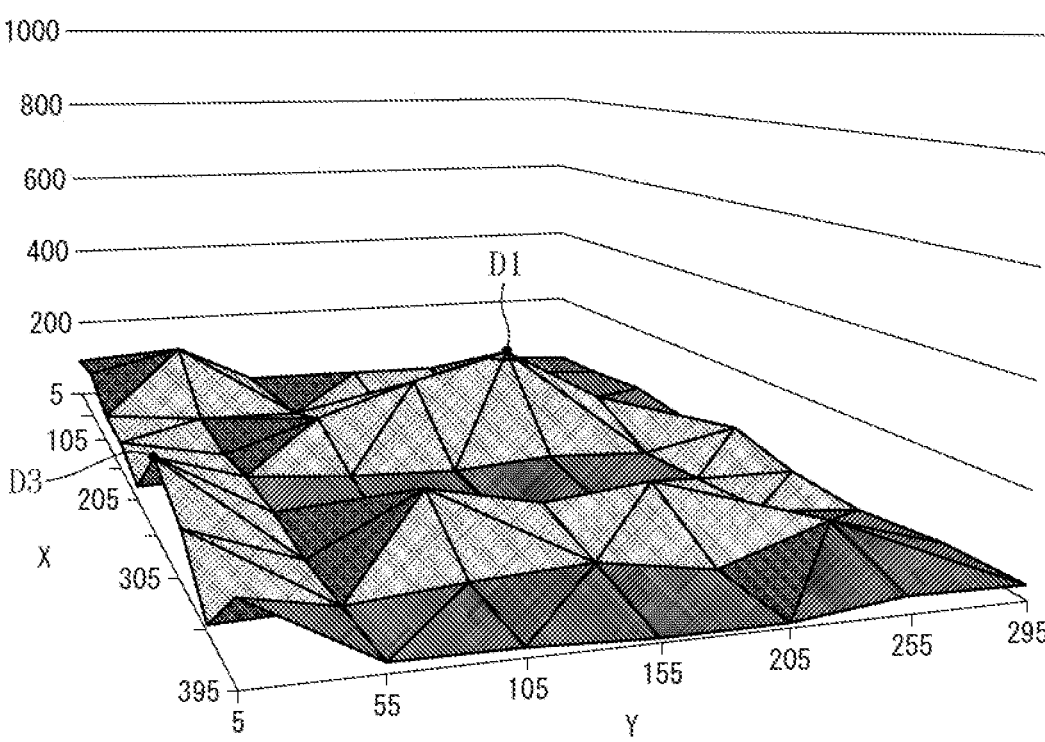
FIG. 11 is a diagram illustrating a warpage distribution when the first placement form is adopted in Example 16.

[Table 9] below shows the height [μm] of the glass sheet from the horizontal surface measured at respective coordinates shown in the same table when the first placement form was adopted in Example 16. FIG. 11 illustrates a warpage distribution (distribution of unevenness on the guaranteed surface) in the same case. In the same case, a mean value of the heights was 46 μm (0.046 mm). A standard deviation of the heights was 0.048.

TABLE 9

| Example 16 | | Y-Coordinate | | | | | | |
|---|---|---|---|---|---|---|---|---|
| First surface | | Y = 5 | Y = 55 | Y = 105 | Y = 155 | Y = 205 | Y = 255 | Y = 295 |
| X- | X = 5 | 87 | 14 | 12 | 12 | 11 | 30 | 19 |
| Coordinate | X = 55 | 105 | 164 | 19 | 64 | 69 | 30 | 25 |
| | X = 105 | 58 | 30 | 31 | 18 | 31 | 22 | 36 |
| | X = 155 | 57 | 10 | 87 | 158 | $W_{1MAX}$ 216 | 81 | 18 |
| | X = 205 | 27 | 29 | 11 | 8 | 19 | 11 | 58 |
| | X = 255 | $W_{1OUT}$ 161 | 25 | 9 | 2 | 11 | 19 | 17 |
| | X = 305 | 103 | 12 | 131 | 85 | 111 | 29 | 6 |
| | X = 355 | 5 | 17 | 37 | 51 | 13 | 85 | 26 |
| | X = 395 | 149 | 15 | 13 | 0 | 5 | 29 | 25 |

Figure 12:
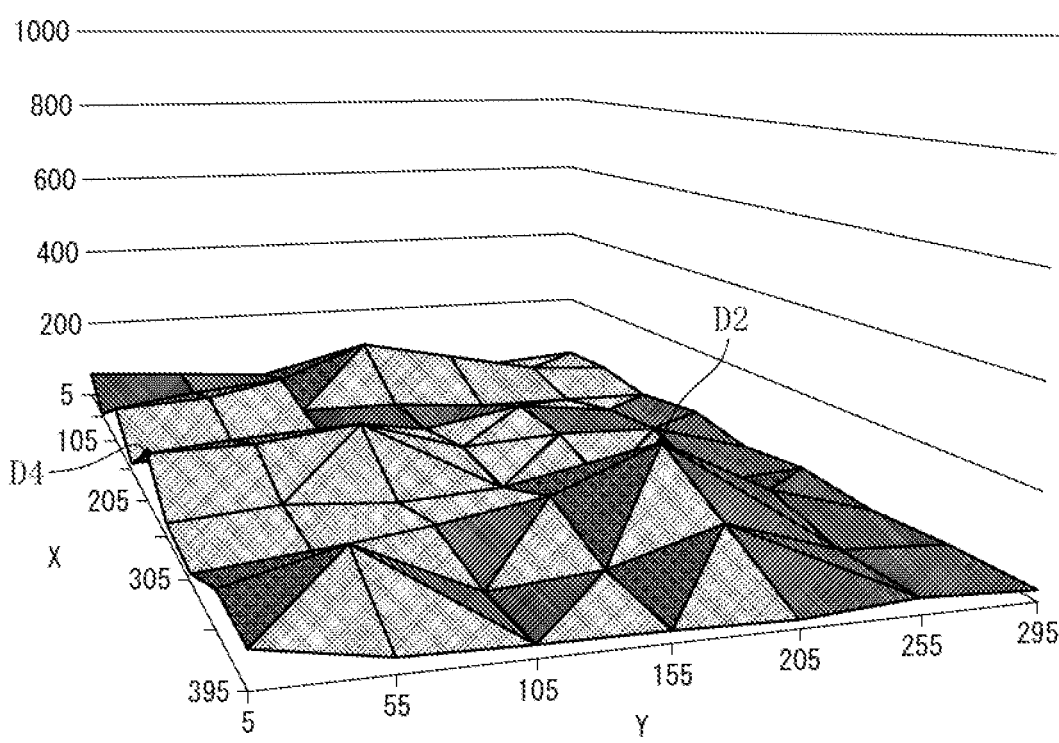
FIG. 12 is a diagram illustrating a warpage distribution when the second placement form is adopted in Example 16.

[Table 10] below shows the height [μm] of the glass sheet from the horizontal surface measured at respective coordinates shown in the same table when the second placement form was adopted in Example 16. FIG. 12 illustrates a warpage, distribution (distribution of unevenness on the non-guaranteed surface) in the same case. In the same case, a mean value of the heights was 48 μm (0.048 mm). A standard deviation of the heights was 0.037.

TABLE 10

| Example 16 | | Y-Coordinate | | | | | | |
|---|---|---|---|---|---|---|---|---|
| Second surface | | Y = 5 | Y = 55 | Y = 105 | Y = 155 | Y = 205 | Y = 255 | Y = 295 |
| X-Coordinate | X = 5 | 54 | 39 | 20 | 23 | 22 | 14 | 30 |
| | X = 55 | 0 | 43 | 61 | 149 | 103 | 49 | 38 |
| | X = 105 | 72 | 87 | 37 | 41 | 17 | 22 | 17 |
| | X = 155 | 6 | 45 | 25 | 35 | 73 | 53 | 35 |
| | X = 205 | $W_{2OUT}$ 98 | 103 | 134 | 59 | 73 | 72 | 13 |
| | X = 255 | 26 | 47 | 29 | 41 | 21 | 11 | 28 |
| | X = 305 | 10 | 36 | 59 | 96 | $W_{2MAX}$ 186 | 69 | 11 |
| | X = 355 | 72 | 133 | 23 | 37 | 101 | 31 | 22 |
| | X = 395 | 66 | 27 | 23 | 19 | 13 | 28 | 19 |

Figure 13:
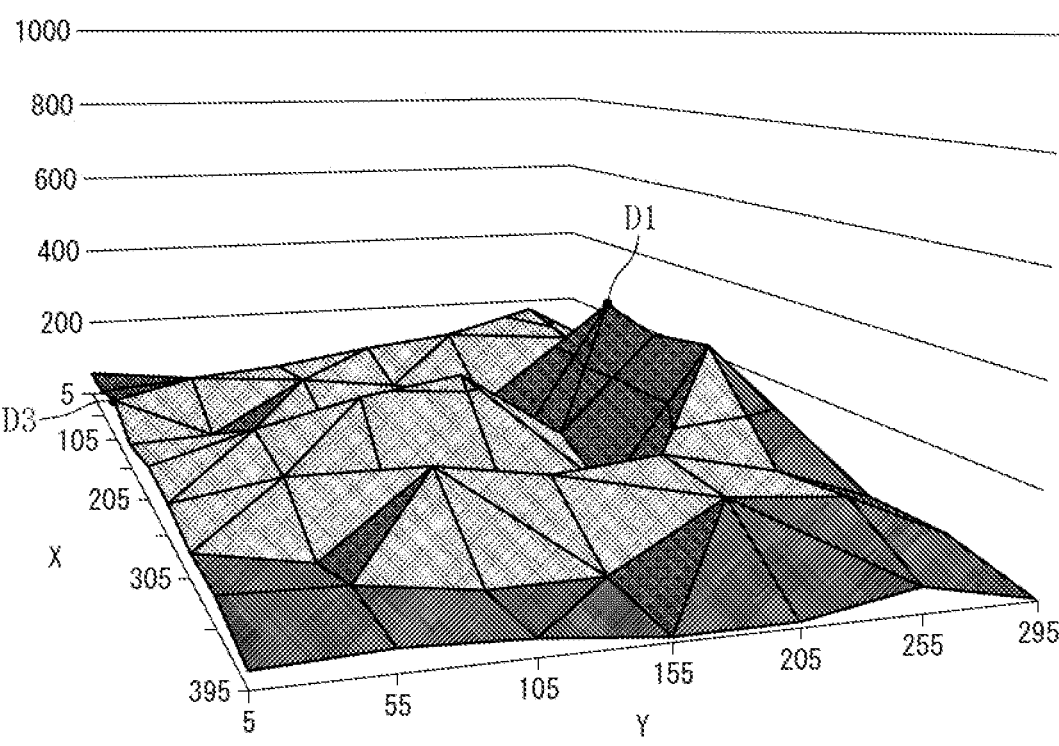
FIG. 13 is a diagram illustrating a warpage distribution when the first placement form is adopted in Example 17.

[Table 11] below shows the height [μm] of the glass sheet from the horizontal surface measured at respective coordinates shown in the same table when the first placement form was adopted in Example 17. FIG. 13 illustrates a warpage distribution (distribution of unevenness on the guaranteed surface) in the same case. In the same case, a mean value of the heights was 84 μm (0.084 mm). A standard deviation of the heights was 0.076.

TABLE 11

| Example 17 First surface | | Y-Coordinate | | | | | | |
|---|---|---|---|---|---|---|---|---|
| | | Y = 5 | Y = 55 | Y = 105 | Y = 155 | Y = 205 | Y = 255 | Y = 295 |
| X-Coordinate | X = 5 | 54 | 30 | 23 | 50 | 28 | 65 | 68 |
| | X = 55 | 57 | 82 | 100 | 137 | 163 | 219 | 37 |
| | X = 105 | $W_{1OUT}$ 94 | 2 | 119 | 92 | 25 | 191 | 90 |
| | X = 155 | 53 | 16 | 33 | 127 | 9 | $W_{1MAX}$ 321 | 39 |
| | X = 205 | 72 | 137 | 190 | 227 | 76 | 298 | 85 |
| | X = 255 | 63 | 102 | 7 | 51 | 14 | 319 | 19 |
| | X = 305 | 49 | 7 | 177 | 143 | 164 | 115 | 36 |
| | X = 355 | 52 | 56 | 24 | 25 | 150 | 134 | 39 |
| | X = 395 | 29 | 39 | 33 | 9 | 7 | 45 | 0 |

Figure 14:
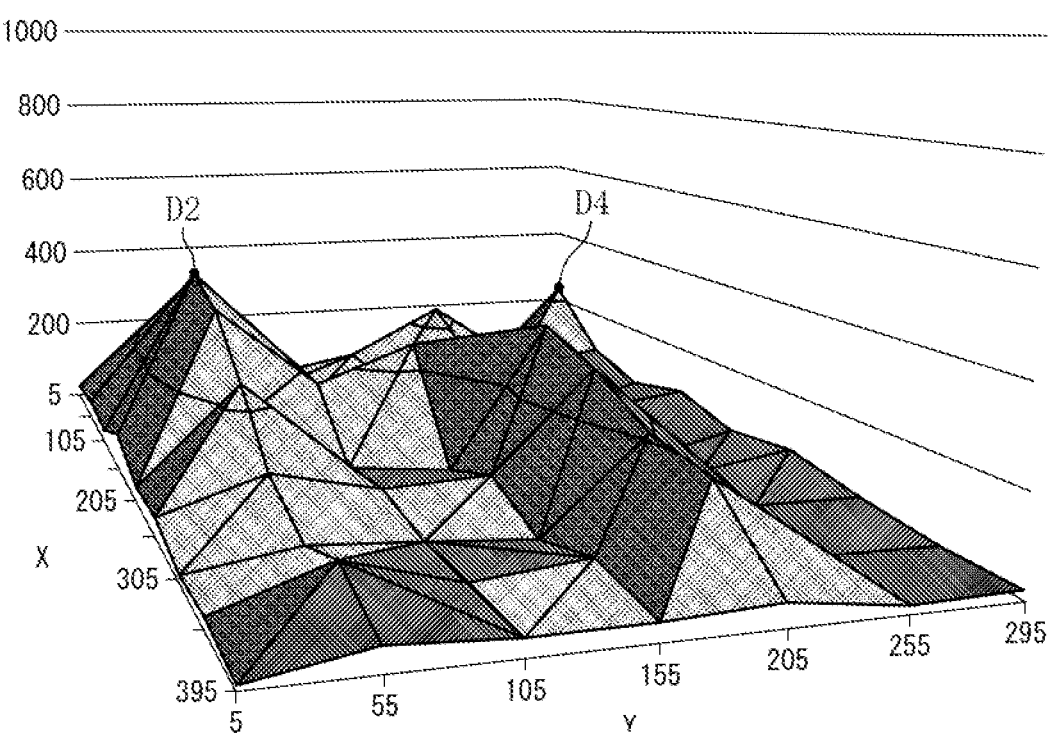
FIG. 14 is a diagram illustrating a warpage distribution when the second placement form is adopted in Example 17.

[Table 12] below shows the height [μm] of the glass sheet from the horizontal surface measured at respective coordinates shown in the same table when the second placement form was adopted in Example 17. FIG. 14 illustrates a warpage distribution (distribution of unevenness on the non-guaranteed surface) in the same case. In the same case, a mean value of the heights was 90 μm (0.09 mm). A standard deviation of the heights was 0.098.

TABLE 12

| Example 17 Second surface | | Y-Coordinate | | | | | | |
|---|---|---|---|---|---|---|---|---|
| | | Y = 5 | Y = 55 | Y = 105 | Y = 155 | Y = 205 | Y = 255 | Y = 295 |
| X-Coordinate | X = 5 | 20 | 57 | 13 | 32 | 31 | 17 | $W_{2OUT}$ 233 |
| | X = 55 | 41 | 314 | 33 | 122 | 238 | 73 | 97 |
| | X = 105 | 23 | $W_{2MAX}$ 406 | 29 | 67 | 160 | 0 | 58 |
| | X = 155 | 81 | 359 | 169 | 254 | 182 | 58 | 90 |
| | X = 205 | 28 | 245 | 31 | 12 | 335 | 1 | 51 |
| | X = 255 | 39 | 115 | 56 | 71 | 287 | 30 | 71 |
| | X = 305 | 9 | 45 | 30 | 13 | 210 | 37 | 44 |
| | X = 355 | 23 | 103 | 33 | 62 | 189 | 21 | 25 |
| | X = 395 | 10 | 47 | 33 | 35 | 43 | 12 | 19 |

Figure 15:
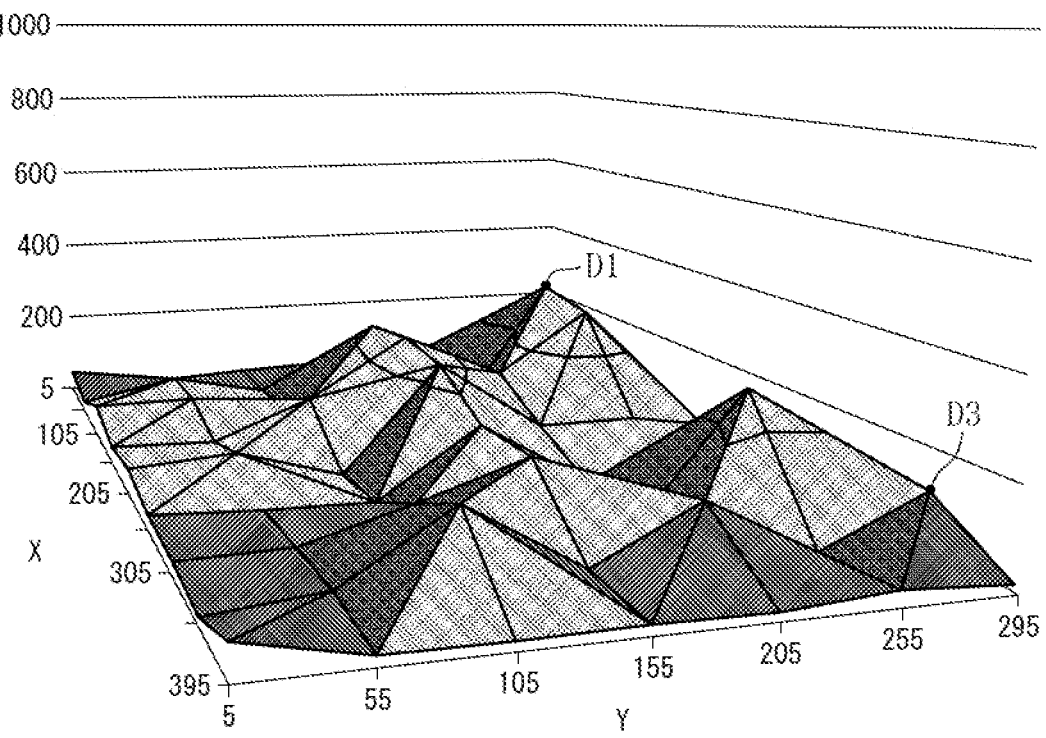
FIG. 15 is a diagram illustrating a warpage distribution when the first placement form is adopted in Example 18.

[Table 13] below shows the height [μm] of the glass sheet from the horizontal surface measured at respective coordinates shown in the same table when the first placement form was adopted in Example 18. FIG. 15 illustrates a warpage distribution (distribution of unevenness on the guaranteed surface) in the same case. In the same case, a mean value of the heights was 70 μm (0.07 mm). A standard deviation of the heights was 0.078.

TABLE 13

| Example 18 First surface | | Y-Coordinate | | | | | | |
|---|---|---|---|---|---|---|---|---|
| | | Y = 5 | Y = 55 | Y = 105 | Y = 155 | Y = 205 | Y = 255 | Y = 295 |
| X-Coordinate | X = 5 | 43 | 14 | 18 | 27 | 34 | 36 | 8 |
| | X = 55 | 18 | 65 | 12 | 49 | 115 | 53 | 22 |
| | X = 105 | 65 | 71 | 36 | 233 | 8 | $W_{1MAX}$ 315 | 15 |
| | X = 155 | 34 | 28 | 118 | 254 | 147 | 289 | 30 |
| | X = 205 | 49 | 72 | 3 | 238 | 79 | 84 | 0 |
| | X = 255 | 27 | 21 | 18 | 162 | 14 | 135 | 37 |
| | X = 305 | 23 | 30 | 92 | 165 | 19 | 276 | 23 |
| | X = 355 | 15 | 34 | 172 | 29 | 134 | 11 | $W_{1OUT}$ 111 |
| | X = 395 | 67 | 20 | 17 | 17 | 14 | 29 | 16 |

Figure 16:
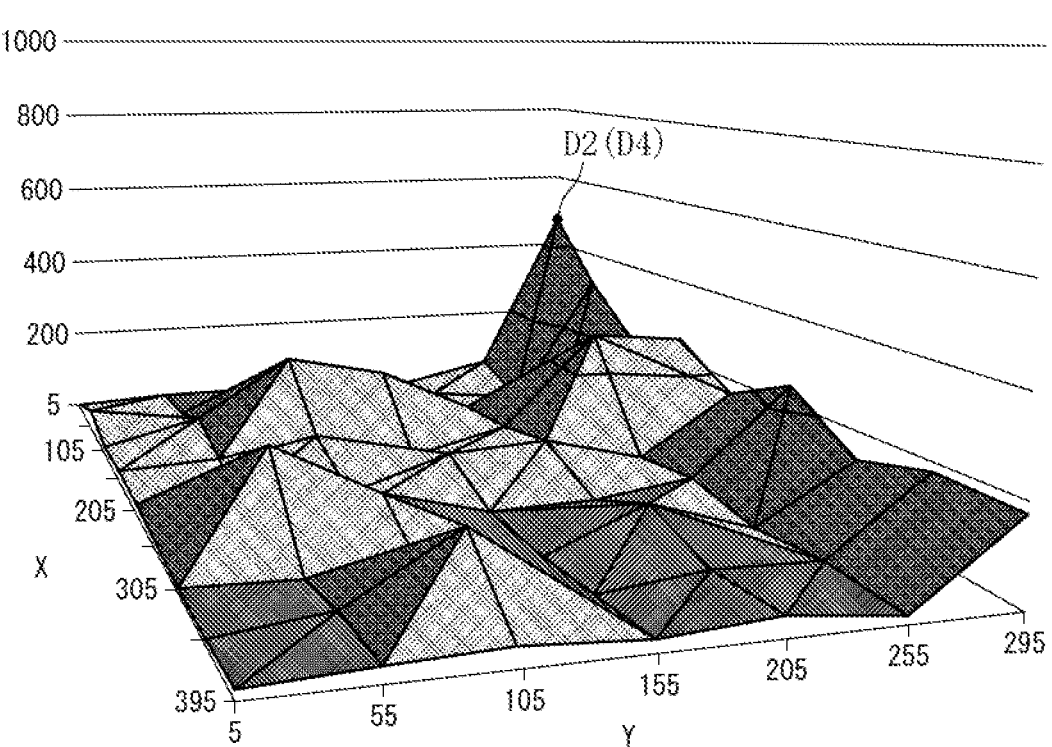
FIG. 16 is a diagram illustrating a warpage distribution when the second placement form is adopted in Example 18.

[Table 14] below shows the height [μm] of the glass sheet from the horizontal surface measured at respective coordinates shown in the same table when the second placement form was adopted in Example 18. FIG. 16 illustrates a warpage distribution (distribution of unevenness on the non-guaranteed surface) in the same case. As illustrated in the same figure in the same case, the second peak position D2 and the second peripheral edge peak position D coincide with each other (the value of $W_{2MAX}$ and the value of $W_{2OUT}$ are the same). In the same case, a mean value of the heights was 72 μm (0.072 mm). A standard deviation of the heights was 0.094.

TABLE 14

| Example 18 | | Y-Coordinate | | | | | | |
|---|---|---|---|---|---|---|---|---|
| Second surface | | Y = 5 | Y = 55 | Y = 105 | Y = 155 | Y = 205 | Y = 255 | Y = 295 |
| X-Coordinate | X = 5 | 3 | 15 | 15 | 0 | 7 | 59 | $W_{2MAX}$ 479 |
| | X = 55 | 39 | 19 | 45 | 46 | 31 | 5 | 322 |
| | X = 105 | 6 | 69 | 208 | 162 | 49 | 15 | 191 |
| | X = 155 | 15 | 29 | 69 | 5 | 61 | 277 | 259 |
| | X = 205 | 12 | 17 | 3 | 73 | 87 | 29 | 171 |
| | X = 255 | 15 | 193 | 73 | 14 | 18 | 48 | 247 |
| | X = 305 | 6 | 0 | 6 | 8 | 86 | 15 | 144 |
| | X = 355 | 0 | 30 | 162 | 10 | 38 | 28 | 187 |
| | X = 395 | 20 | 31 | 38 | 22 | 40 | 11 | 178 |

Figure 17:
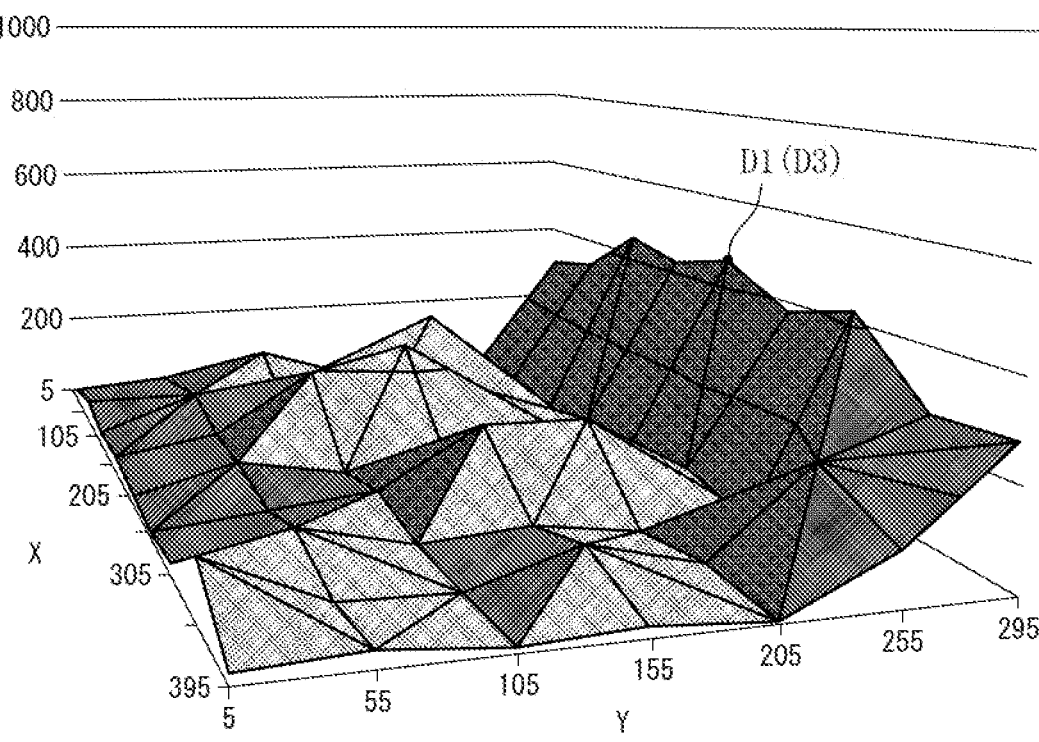
FIG. 17 is a diagram illustrating a warpage distribution when the first placement form is adopted in Comparative Example 4.

[Table 15] below shows the height [μm] of the glass sheet from the horizontal surface measured at respective coordinates shown in the same table when the first placement form was adopted in Comparative Example 4. FIG. 17 illustrates a warpage distribution (distribution of unevenness on the guaranteed surface) in the same case. As illustrated in the same figure in the same case, the first peak position D1 and the first peripheral edge peak position D3 coincide with each other (the value of $W_{1MAX}$ and the value of $W_{1OUT}$ are the same). In the same case, a mean value of the heights was 101 μm (0.101 mm). A standard deviation of the heights was 0.128.

TABLE 15

| Comparative Example 4 | | Y-Coordinate | | | | | | |
|---|---|---|---|---|---|---|---|---|
| First surface | | Y = 5 | Y = 55 | Y = 105 | Y = 155 | Y = 205 | Y = 255 | Y = 295 |
| X-Coordinate | X = 5 | 10 | 31 | 28 | 31 | 52 | 16 | 309 |
| | X = 55 | 31 | 52 | 143 | 50 | 212 | 35 | 337 |
| | X = 105 | 14 | 99 | 8 | 16 | 9 | 6 | 456 |
| | X = 155 | 20 | 58 | 200 | 251 | 112 | 25 | 425 |
| | X = 205 | 8 | 58 | 17 | 17 | 90 | 5 | $W_{1MAX}$ 464 |
| | X = 255 | 4 | 30 | 51 | 179 | 176 | 42 | 379 |
| | X = 305 | 25 | 74 | 17 | 36 | 0 | 9 | 428 |
| | X = 355 | 126 | 19 | 12 | 80 | 21 | 203 | 277 |
| | X = 395 | 22 | 33 | 9 | 20 | 1 | 109 | 290 |

Figure 18:
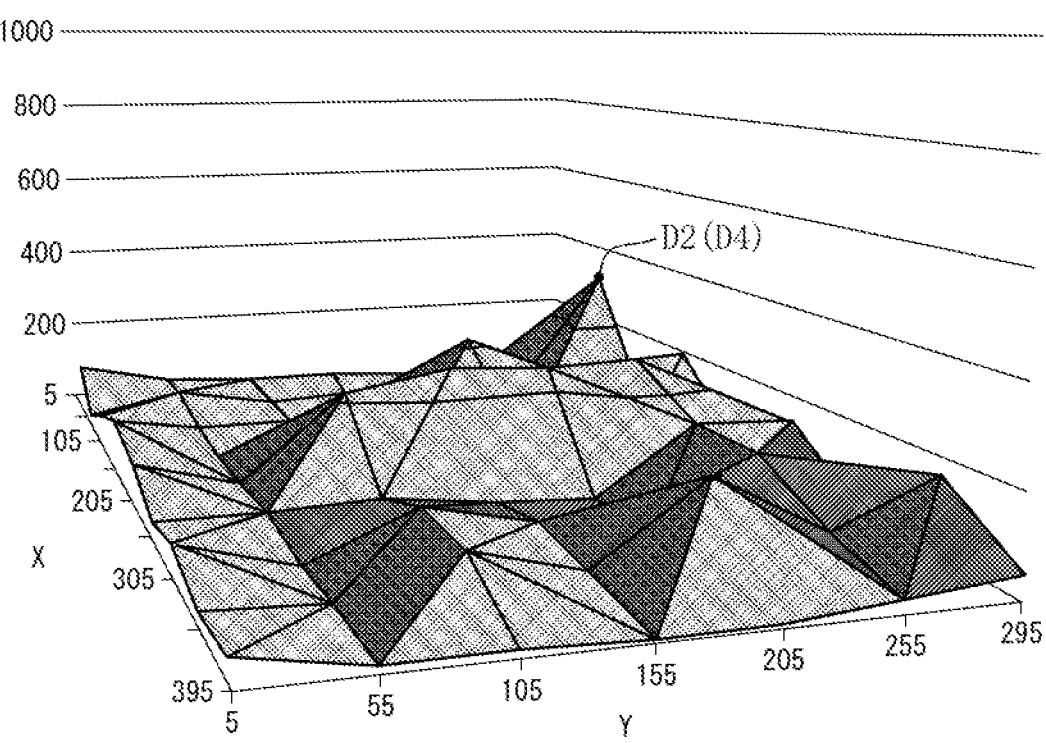
FIG. 18 is a diagram illustrating a warpage distribution when the second placement form is adopted in Comparative Example 4.

[Table 16] below shows the height [μm] of the glass sheet from the horizontal surface measured at respective coordinates shown in the same table when the second placement form was adopted in Comparative Example 4. FIG. 18 illustrates a warpage distribution (distribution of unevenness on the non-guaranteed surface) in the same case. As illustrated in the same figure in the same case, the second peak position D2 and the second peripheral edge peak-position D4 coincide with each other (the value of $W_{2MAX}$ and the value of $W_{2OUT}$ are the same). In the same case, a mean value of the heights was 73 μm (0.073 mm). A standard deviation of the heights was 0.077.

TABLE 16

| Comparative Example 4 | | Y-Coordinate | | | | | | |
|---|---|---|---|---|---|---|---|---|
| Second surface | | Y = 5 | Y = 55 | Y = 105 | Y = 155 | Y = 205 | Y = 255 | Y = 295 |
| X-Coordinate | X = 5 | 90 | 38 | 24 | 22 | 11 | 33 | 135 |
| | X = 55 | 7 | 56 | 11 | 0 | 6 | 19 | $W_{2MAX}$ 316 |
| | X = 105 | 69 | 21 | 21 | 80 | 217 | 122 | 71 |
| | X = 155 | 116 | 14 | 1 | 12 | 30 | 47 | 202 |
| | X = 205 | 88 | 16 | 217 | 259 | 248 | 252 | 22 |
| | X = 255 | 33 | 34 | 45 | 15 | 3 | 158 | 146 |

TABLE 16-continued

| Comparative Example 4 | | | | Y-Coordinate | | | |
| --- | --- | --- | --- | --- | --- | --- | --- |
| Second surface | Y = 5 | Y = 55 | Y = 105 | Y = 155 | Y = 205 | Y = 255 | Y = 295 |
| X = 305 | 74 | 8 | 108 | 53 | 22 | 161 | 18 |
| X = 355 | 41 | 27 | 100 | 30 | 207 | 69 | 169 |
| X = 395 | 59 | 15 | 16 | 7 | 12 | 21 | 50 |

As described above, it can be seen that of Examples 14 to 18, even in Examples 17 and 18 in which the mean value of the heights and the standard deviation of the heights were relatively large, it was possible to suppress breakage of the glass sheet (see also [Table 4] mentioned above). That is, it was possible to suppress breakage even in a glass sheet including a portion where the height from the horizontal surface was increased due to warpage or a glass sheet in which the unevenness of the guaranteed surface and the non-guaranteed surface greatly changes due to warpage. It is presumed that such results were obtained because in each of the examples, the first peak position is present in the part inside the peripheral edge portion of the glass sheet.

Next, as a second example, other glass sheets for chemical strengthening (Example 19) having the parameters shown in [Table 17] below were prepared. The rates of occurrence of breakage (breakage rate) in the glass sheets due to warpage in manufacturing steps that the glass sheets undergo before becoming strengthened glass sheets were determined. As the manufacturing steps, specifically, a cutting out step of cutting out a glass sheet for chemical strengthening from a glass film original sheet, a cleaning step after the cutting out, and an appearance inspection step were performed. Note that the glass sheet for chemical strengthening in the second example is a glass sheet containing, in mol %, 66.1% of $SiO_2$, 14.0% of $Al_2O_3$, 2.5% of $B_2O_3$, 3.0% of MgO, 13.4% of $Na_2O$, and 0.6% of $K_2O$, having a strain point of 551° C. and a thermal expansion coefficient of $79 \times 10^{-7}/°$ C. at from 30° C. to 380° C., and formed by the overflow down-draw method.

The height from the horizontal surface of the glass sheet (long side×short side: 500 mm×400 mm) of the second example was measured at respective coordinates at which straight lines parallel to the Y-axis and straight lines parallel to the X-axis intersect each other, the straight lines being set at intervals of 5 mm on the XY coordinates mentioned above. In this second example, the case where the peripheral edge portion of the glass sheet had a width of 50 mm was considered. Accordingly, when at least one of the condition that the X-coordinate of the first peak position is 50 mm or lower or 450 mm or higher or the condition that the Y-coordinate of the first peak position is 50 mm or lower or 350 mm or higher is satisfied, the item of "Maximum value is inside" for the first peak position is "poor". When neither condition is satisfied, the item of "Maximum value is inside" for the first peak position is "good". Similarly, when at least one of the condition that the X-coordinate of the second peak position is 50 mm or lower or 450 mm or higher or the condition that the Y-coordinate of the second peak position is 50 mm or lower or 350 mm or higher is satisfied, the item of "Maximum value is inside" for the second peak position is "poor". When neither condition is satisfied, the item of "Maximum value is inside" for the second peak position is "good".

TABLE 17

| | | | Example 19 |
| --- | --- | --- | --- |
| Glass size | | Long side X (mm) | 500 |
| | | Short side Y (mm) | 400 |
| | Sheet thickness t (mm) | | 0.035 |
| First surface height | Maximum position | $X_1$ (mm) | 365 |
| | | $Y_1$ (mm) | 265 |
| | In-plane maximum value | $W_{1MAX}$ (mm) | 0.318 |
| | | Maximum value is inside | Good |
| | | Peripheral edge portion maximum value $W_{1OUT}$ (mm) | 0.154 |
| First surface | | $t^2/W_{1OUT}$ | 0.008 |
| | | $W_{1OUT}/t$ | 4.4 |
| | | $W_{1MAX}/t$ | 9.1 |
| Second surface height | Maximum position | $X_2$ (mm) | 365 |
| | | $Y_2$ (mm) | 265 |
| | Maximum value | $W_{2MAX}$ (mm) | 0.377 |
| | | Maximum value is inside | Good |
| | | Peripheral edge portion maximum value $W_{2OUT}$ (mm) | 0.158 |
| Second surface | | $t^2/W_{2OUT}$ | 0.008 |
| | | $W_{2OUT}/t$ | 4.5 |
| | | $W_{2MAX}/t$ | 10.8 |
| Breakage rate (%) | | | 0.0 |

From the breakage rate shown in [Table 17], it can be seen that in Example 19 in which the first peak position was present in the part inside the peripheral edge portion (having a width of 50 mm) of the glass sheet, breakage of the glass sheet did not occur at all.

Figure 19:
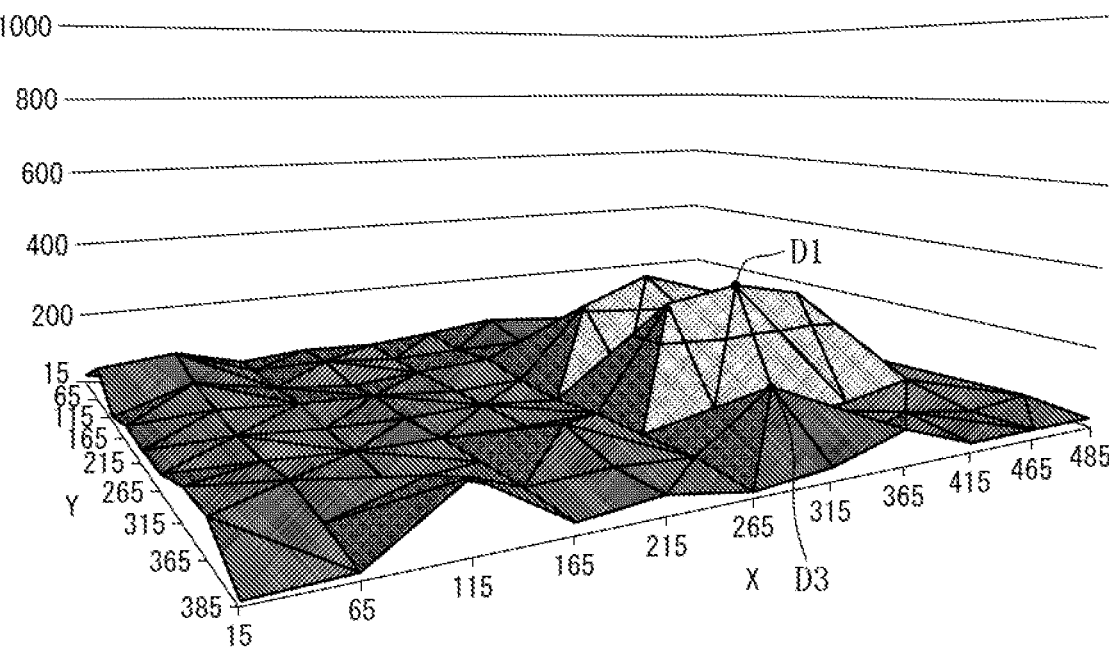
FIG. 19 is a diagram illustrating a warpage distribution when the first placement form is adopted in Example 19.

[Table 18] below shows the height [μm] of the glass sheet from the horizontal surface measured at respective coordinates shown in the same table when the first placement form was adopted in Example 19. FIG. 19 illustrates a warpage distribution (distribution of unevenness on the guaranteed surface) in the same case. Specifically, heights measured at respective coordinates at which eleven straight lines parallel to the Y-axis represented by X=15, 65, 115, 165, 215, 265, 315, 365, 415, 465, and 485, respectively, and nine straight lines parallel to the X-axis represented by Y=15, 65, 115, 165, 215, 265, 315, 365, and 385, respectively, intersect each other are extracted and illustrated. In the same case, a mean value of the heights was 51 μm (0.051 mm). A standard deviation of the heights was 0.062.

TABLE 18

| Example 19 | | Y-Coordinate | | | | | | | | |
|---|---|---|---|---|---|---|---|---|---|---|
| First surface | | Y = 15 | Y = 65 | Y = 115 | Y = 165 | Y = 215 | Y = 265 | Y = 315 | Y = 365 | Y = 385 |
| X-Coordinate | X = 15 | 21 | 90 | 9 | 36 | 34 | 39 | 78 | 86 | 9 |
| | X = 65 | 11 | 108 | 71 | 47 | 39 | 35 | 55 | 35 | 16 |
| | X = 115 | 15 | 31 | 26 | 33 | 21 | 25 | 12 | 92 | $W_{1OUT}$ 154 |
| | X = 165 | 28 | 35 | 9 | 30 | 23 | 24 | 27 | 31 | 26 |
| | X = 215 | 22 | 17 | 24 | 13 | 25 | 20 | 83 | 40 | 45 |
| | X = 265 | 39 | 20 | 37 | 18 | 11 | 24 | 23 | 28 | 15 |
| | X = 315 | 61 | 24 | 61 | 215 | 44 | 286 | 43 | 165 | 30 |
| | X = 365 | 43 | 18 | 67 | 280 | 33 | $W_{1MAX}$ 318 | 7 | 0 | 86 |
| | X = 415 | 32 | 33 | 45 | 222 | 11 | 278 | 21 | 46 | 21 |
| | X = 465 | 30 | 28 | 38 | 30 | 52 | 49 | 55 | 18 | 24 |
| | X = 485 | 28 | 30 | 30 | 22 | 17 | 17 | 24 | 34 | 22 |

Figure 20:
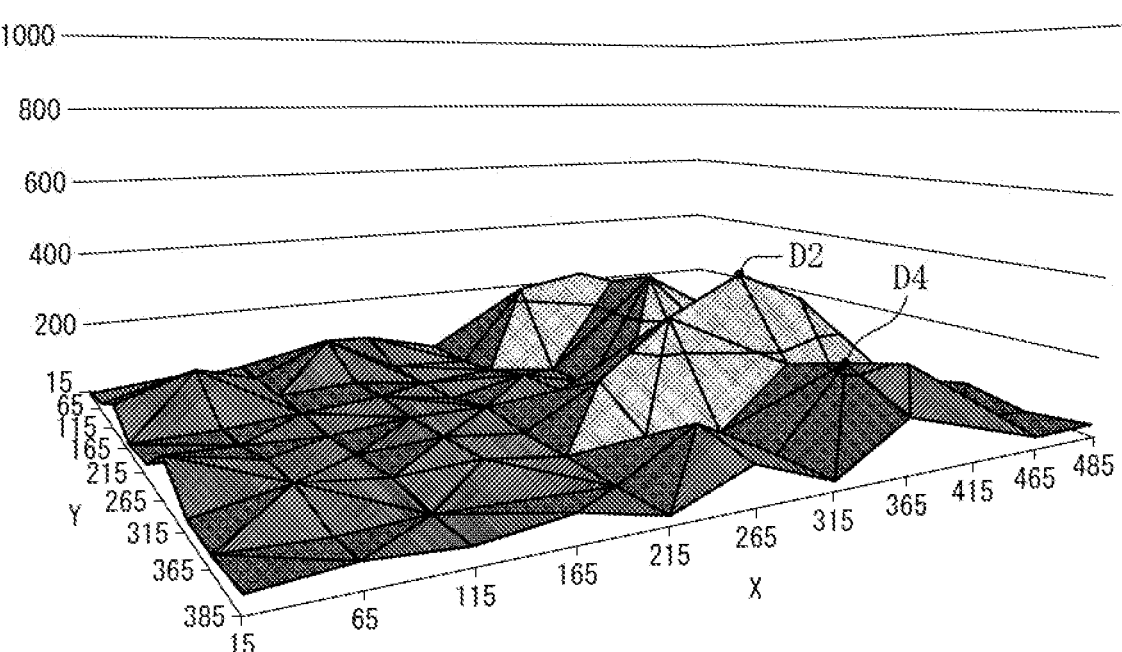
FIG. 20 is a diagram illustrating a warpage distribution when the second placement form is adopted in Example 19.

[Table 19] below shows the height [μm] of the glass sheet from the horizontal surface measured at respective coordinates shown in the same table when the second placement form was adopted in Example 19. FIG. 20 illustrates a warpage distribution (distribution of unevenness on the non-guaranteed surface) in the same case. In the same case, a mean value of the heights was 67 μm (0.067 mm). A standard deviation of the heights was 0.077.

TABLE 19

| Example 19 | | Y-Coordinate | | | | | | | | |
|---|---|---|---|---|---|---|---|---|---|---|
| Second surface | | Y = 15 | Y = 65 | Y = 115 | Y = 165 | Y = 215 | Y = 265 | Y = 315 | Y = 365 | Y = 385 |
| X-Coordinate | X = 15 | 2 | 17 | 68 | 18 | 22 | 105 | 33 | 33 | 36 |
| | X = 65 | 23 | 19 | 135 | 22 | 37 | 62 | 71 | 23 | 54 |
| | X = 115 | 27 | 35 | 34 | 37 | 28 | 36 | 46 | 34 | 39 |
| | X = 165 | 33 | 130 | 49 | 54 | 50 | 53 | 55 | 26 | 66 |
| | X = 215 | 81 | 25 | 20 | 19 | 47 | 29 | 28 | 21 | 20 |
| | X = 265 | 26 | 20 | 33 | 63 | 61 | 138 | 53 | 132 | 98 |
| | X = 315 | 33 | 235 | 14 | 9 | 35 | 281 | 22 | 11 | 25 |
| | X = 365 | $W_{2OUT}$ 158 | 266 | 275 | 318 | 55 | $W_{2MAX}$ 377 | 175 | 221 | 136 |
| | X = 415 | 36 | 29 | 20 | 201 | 24 | 300 | 35 | 193 | 84 |
| | X = 465 | 29 | 38 | 28 | 10 | 22 | 26 | 27 | 25 | 29 |
| | X = 485 | 26 | 19 | 28 | 22 | 45 | 23 | 49 | 19 | 33 |

REFERENCE SIGNS LIST

D1 First peak position
D2 Second peak position
D3 First peripheral edge peak position
D4 Second peripheral edge peak position
12 Glass sheet for chemical strengthening
12a One main surface
12b Another main surface
12e Peripheral edge portion

The invention claimed is:

1. A glass sheet having a thickness of 0.1 mm or less, wherein the glass sheet has a warped shape as a whole or includes a warped part in a portion thereof, the thickness of the glass sheet is t [mm], a first peak position of warpage is present in a part located further inside than a peripheral edge portion of the glass sheet, where the first peak position of warpage is, when a first placement form is adopted in which the glass sheet is placed on a horizontal surface with one main surface facing upward, a position having a highest height from the horizontal surface in the glass sheet, and the peripheral edge portion is a part having a width of 10 mm along a peripheral edge of the glass sheet.

2. The glass sheet according to claim 1, wherein when the first placement form is adopted, a relationship of $t^2/W_{1OUT} > 0.005$ is satisfied, where $W_{1OUT}$ [mm] is a height at a position having a highest height from the horizontal surface in the peripheral edge portion.

3. The glass sheet according to claim 1, wherein when the first placement form is adopted, a relationship of $W_{1OUT} \leq 0.20$ mm is satisfied, where $W_{1OUT}$ [mm] is a height at a position having a highest height from the horizontal surface in the peripheral edge portion.

4. The glass sheet according to claim 1, wherein when the first placement form is adopted, a relationship of $W_{1OUT}/t < 5$ is satisfied, where $W_{1OUT}$ [mm] is a height at a position having a highest height from the horizontal surface in the peripheral edge portion.

5. The glass sheet according to claim 1, wherein a relationship of $W_{1MAX}/t < 15$ is satisfied, where $W_{1MAX}$ [mm] is the height of the glass sheet from the horizontal surface at the first peak position of warpage.

6. The glass sheet according to claim 1, wherein the one main surface and another main surface on a back side of the one main surface are fire-polished surfaces.

7. The glass sheet according to claim 1, wherein the thickness of the glass sheet is 0.05 mm or less.

8. The glass sheet according to claim 1, wherein the glass sheet as a whole has a substantially uniform thickness.

9. The glass sheet according to claim 1, wherein when the second placement form is adopted, a relationship of $t^2/W_{2OUT} > 0.005$ is satisfied, where $W_{2OUT}$ [mm] is a height at a position having a highest height from the horizontal surface in the peripheral edge portion.

10. The glass sheet according to claim 1, wherein
when the second placement form is adopted, a relation-
ship of $W_{2OUT} \leq 0.20$ mm is satisfied, where $W_{2OUT}$
[mm] is a height at a position having a highest height
from the horizontal surface in the peripheral edge
portion.

11. The glass sheet according to claim 1, wherein
when the second placement form is adopted, a relation-
ship of $W_{2OUT}/t < 5$ is satisfied, where $W_{2OUT}$ [mm] is a
height at a position having a highest height from the
horizontal surface in the peripheral edge portion.

12. The glass sheet according to claim 1, wherein
a relationship of $W_{2MAX}/t < 15$ is satisfied, where $W_{2MAX}$
[mm] is the height of the glass sheet from the horizontal
surface at the second peak position of warpage.

13. The glass sheet according to claim 1, wherein
the glass sheet is aluminosilicate glass, and
the glass sheet includes as a glass composition, in mass %,
from 50% to 80% of $SiO_2$, from 5% to 25% of $Al_2O_3$,
from 0% to 15% of $B_2O_3$, from 1% to 20% of $Na_2O$,
and from 0% to 10% of $K_2O$.

14. The glass sheet according to claim 13, wherein
the glass sheet is aluminosilicate glass, and includes as the
glass composition, in mass %, from 60% to 80% of
$SiO_2$, from 8% to 20% of $Al_2O_3$, from 0% to 5% of
$B_2O_3$, from 4% to 16% of $Na_2O$, and from 0.01% to
10% of $K_2O$.

15. The glass sheet according to claim 1, wherein
the glass sheet has a rectangular shape, and
the glass sheet has a length of from 150 mm to 1100 mm
and a width of from 150 mm to 1300 mm.

\*  \*  \*  \*  \*